United States Patent

Howell, Jr. et al.

[15] 3,707,705

[45] Dec. 26, 1972

[54] MEMORY MODULE

[72] Inventors: Jones V. Howell, Jr., 9201 Vanalden Avenue, Northridge, Calif. 91324; David W. Mayne, 18408 Clifftop Way, Malibu, Calif. 90265

[22] Filed: Dec. 20, 1967

[21] Appl. No.: 692,101

[52] U.S. Cl..340/174 MA, 340/174 M, 340/174 LA, 340/174 NC

[51] Int. Cl.............................G11c 11/06, G11c 5/04

[58] Field of Search.......................................340/174

[56] References Cited

UNITED STATES PATENTS

| | | | |
|---|---|---|---|
| 3,075,184 | 1/1963 | Warman et al. | 340/174 |
| 3,110,017 | 11/1963 | Thornton | 340/174 |
| 3,214,742 | 10/1965 | Bobeck | 340/174 |
| 3,394,357 | 7/1968 | Harding | 340/174 |
| 3,161,860 | 12/1964 | Grooteboer | 340/174 |
| 3,436,738 | 4/1969 | Martin | 340/173 |
| 3,257,649 | 6/1966 | Dietrich et al. | 340/174 |
| 3,027,546 | 3/1962 | Howes et al. | 340/174 |
| 3,343,147 | 9/1967 | Ashwell | 340/174 |
| 3,440,624 | 4/1969 | Sherlock et al. | 340/174 |
| 3,520,052 | 7/1970 | Hoffmann | 340/174 X |
| 3,218,615 | 11/1965 | Reimer et al. | 340/174 MA |
| 3,221,286 | 11/1965 | Fedde | 340/174 MA |
| 3,444,535 | 5/1969 | Lukianov | 340/174 MA |

OTHER PUBLICATIONS

IBM Technical Disclosure Bulletin, "Core Store Addressing" by Harper; Vol. 9, No. 10, 3/67, p. 1401, 1402.

MOSFET in Circuit Design, by Robert Crawford, McGraw-Hill Book Company, copyright 1967, pages 113–118.

Computer Design, "A 2½ D Integrated Circuit Memory" by Zinschlag, 9/66; p. 26–39.

*Primary Examiner*—Stanley M. Urynowicz, Jr.
*Attorney*—Smyth, Roston & Pavitt

[57] ABSTRACT

A core memory unit is disclosed using double card modules with each module having an X wire system common to both cards, and further having several Y wire systems, one per bit position (bit plane). The module holds decoders for X and Y wire systems, driven by a predecoder system common to all modules and external thereto. The Y wire systems operate with anticoincidence, the sense wire system is a double wire system, each wire being rectangularly looped as threaded through half of the cores of the bit locations of each bit position to suppress noise.

40 Claims, 12 Drawing Figures

INVENTORS:
Jones Von Howell
David W. Mayne
By Smyth, Roston & Pavitt
ATTORNEYS

INVENTORS:
Jones VonHowell
David W. Mayne
By [signature]
ATTORNEYS

INVENTORS:
Jones VonHowell
David W. Mayne

By [signature]

ATTORNEYS

INVENTORS:
Jones VonHowell
David W. Mayne

By Smyth, Roston & Pavitt
ATTORNEYS

INVENTORS:
Jones VonHowell
David W. Mayne
By Smyth, Roston & Pavitt
ATTORNEYS

INVENTORS:
Jones Von Howell
David W. Mayne

By [signature]
ATTORNEYS

MEMORY MODULE

The present invention relates to improvements for memories of digital data systems, and more particularly to random access, digital data memory units constructed of memory modules, and to improvements for such modules. Random access digital data memories constitute, for example, the principal storage unit of a digital computer as an integral portion thereof. The control, data processing and computing circuits for a digital computer are usually organized in circuit modules, whereby a module is constituted by a printed circuit card mounted to and inserted in a chassis together with other modules. The printed circuit cards have printed circuit contacts, usually disposed along the rear edge of the card as in the chassis. These contacts are connected to contact terminals. Back wiring in the rear of the chassis connect the several contact terminals of different modules to provide the necessary connections between circuit elements on the several modules.

Among other features and aspects, the circuit modules are constructed and organized to minimize the amount of back wiring required. It is an object of the present invention to facilitate the incorporation of memory in the modular design of a digital system. As adaptation of the invention to a different format can readily be ascertained, the following assumptions will facilitate the description of the invention by way of example and general principles develop merely out of a generalized terminology.

It is assumed that for the general case digital data are processed in the digital system to the word level, meaning (1) that the bivalued digital data bits defining a word are normally processed in parallel; though a lesser number of bits may be so processed and (2) that the memory must be constructed to permit concurrent storage or withdrawal of all bits of a word. The individual bit storage location is constituted by a bistable device such as a magnetizable core or a flip-flop which must be individually adressable, and all bit locations defining a word location must be addressable concurrently. In order to fit into the modular design pattern, the memory must, therefore, be organized so that a particular plurality of bit storage locations are assembled in a module. Such an organization scheme, together with a particular module design, constitutes a principal aspect of the present invention.

Conventionally, core memories are arranged as matrices with rows and columns by a matrix being established by an X–Y wire scheme. A core is disposed on each intersection of an X wire and of a Y wire, there being one such scheme or matrix for all those bit locations storing bits having the same position within any word to be stored. Such an arrangement reduces the number of input channels for addressing a bit location in such a matrix, to X + Y for "X times Y" locations, with letters X and Y symbolically denoting the numbers of X and Y wires respectively. In conventional core memory constructions, however, all four sides of such wire-core matrix (as physical construction) are available and required for establishing the required input connections to each of the X and Y wires. On the other hand, the modular design permits employment of but one side of such a matrix when mounted on a module card to provide the input connections for the X and Y wires. It follows, then, that the number of input connections for such a memory module should be reduced so that module should include some decoding circuitry. To state it differently, for addressing a bit location in an X-Y system one needs two signals, an X and Y signal, or a one-bit code for all X wires and a one-bit code for all Y wires. The addressing signal for each bit location (to be used also for the other bit locations of a word location) is defined as an N-bit code if the number of locations to be distinguished by different addresses is $2^n$. Circuitry is needed to decode any n-bit addressing code, i.e., to convert it into a two bit X-Y code for the control of a pair of X, Y wires.

The addressing device, usually a register, furnishing the n-bit code has n output channels, the X-Y matrix (per bit position) has X + Y input lines or channels. The decoding process then involves the utilization of the n-output channels of the address register to control X + Y input lines (times the number of bits per word). This, in turn, can be done in a stepwise decoding process, incidentally including a stepwise increase of the number of channels from n to X + Y per bit. For example, with $n$=12 and X=Y=$2^6$, the increase is from 12 to 128; additionally it must be considered that the current flow in the X and Y wires must be reversible for distinguishing between record, write or store addressing and read, reproduce or withdraw addressing, so that the number of control channels for the X and Y wire system needs actually doubling (i.e., 256 for this case). One can see that a stepwise decoding (increase in channel number) using some space on the memory module holding an X–Y wire system for decoding, permits a reduction of the number of input channels for the memory module.

Aside from the foregoing, the following constraints have to be considered. The memory must be provided for a particular number of storage locations. The modules must have dimensions compatible with the other circuit modules of the digital system, assuming particularly that it may not be possible to place the entire memory on a single module card. The memory modules in accordance with the principles of the present invention are constructed as double card modules, preferably in a foldable configuration. More than one double card module may be required for a complete memory system. The two cards of a module are hinged together so that they can assume a side by side position of their respective flat sides or for insertion into chassis they can assume a coplanar position when folded up to expose all sides.

A double card module is now provided with an X wire or X line addressing system occupying a particular space on each card with preferably each X line or wire beginning on one card and crossing over the hinged region to the other card, so that the two cards have the same X wire or X line system. One can thus see that each card needs to have only half of the total number of X line input connections (and decoders) of the entire X line system of a double card module. Y wire or addressing line systems are disposed on each card to define an array of intersections with the X lines but remaining insulated therefrom. There will be as many Y line systems on a card as there are different bit planes or bit positions, i.e., bit locations storing bits having different positions in a word to be stored, on the card. The remainder of each card is filled with decoding means, preferably matrix decoders to reduce the number of input channels to the double card module.

The number of X lines and the number of Y line of the X–Y system are usually chosen to be similar because X + Y is at minimum for X = Y (for any given product of X and Y). This has usually been observed whereby one X–Y system per bit position is used. However, if the bit locations for more than one bit position are on a double card module, and if the card is provided for decoding as indicated, X ≠ Y may be required to obtain minimization of the total number of input lines for the memory module. Instead, the minimum number of X and Y lines is given when X times the number of different memory modules needed equals Y times the number of bits per word, assuming thereby that the X wire system has to be repeated for each module. Normally then the minimum number of required X and Y lines for a module is present if Y times the number of different bit positions on a module equals X. This, however, leads to a corresponding minimum of input lines for the module only if the X and Y systems each are addressable by a two bit code, using square type decoder matrices on the cards.

The relation concerning minimum input lines for a memory module remains also true if the lines of one of the systems, for example, each Y line, is looped to intersect each X line twice so that the current direction is of addressing significance. The total number of addressing lines is still X + Y in this case, but the total number of storage places will be 2YX. One can see that in the relation, X=Y times the number of bit positions on a module, the number of bit positions on a card is an arbitrarily variable factor. This permits optimization of the system in that X should be chosen to make the largest possible area on a card available for the storage cells, as this maximizes the number of bit positions per module and minimizes the number of modules.

In the preferred form of practicing the invention, particularly for usage in extensive memories, each double card module holds all bit locations for at least one bit position of all memory locations to the word level, and there must be as many double card modules as needed to obtain all bit positions. For reasons of convenience and versatile system design, the memory design rule should be observed in that manner for the minimum number of digital storage locations for the digital systems, and extensions thereof for obtaining a larger memory should be obtained in units of the minimum unit, so that the same type of memory module of the double card type can be used throughout.

The system design rule can be observed strictly in this manner only if the number of memory locations to be accomodated is a power of 2, if the exponent thereof is an even number and if the number of bit positions per word is also a power of 2. If not, reasonable approximation to the rules can be obtained by satisfying the rule for the nearest power of two, etc., and modifying the result to best suit the actual conditions.

Another point to be considered is the fact that the modules themselves include additional means for decoding the X and Y line systems. Each line system can be decoded by matrix decoders on the card with a minimum in number of decoding input lines for each system requiring square decoding matrices accordingly. This, in turn, requires that the exponents representing S and Y as powers of 2 (i.e., $\log_2{}^X$ and $\log_2{}^Y$) are even numbers. However, the particular total (minimum) number of memory locations for a digital system may be constraint preventing within-optimization on a power-of-two basis in this manner. However, a very near approximation of optimization should then be obtained.

Representatively, it may be assumed that the memory (or a minimum memory unit) is to comprise 4096 ($=2^{12}$) locations for a 32 ($=2^5$) bits each; or $2^{17}$ total. Inasmuch as one of the X–Y systems is intended to use double (looped) wires, optimum conditions are the same as for a total of $2^{16}$ locations using unlooped X and Y wires. Thus, each of the X–Y line systems, when decoded by bus systems of $2^4$ buses each constitute the minimum decoding systems, if all locations could be placed on one module. Two fortunately complementing points, however, make it impractical to use the minimum decoder system. First, if the X and Y lines are wires, and if cores are used as storage cells, then $2^8$ or 256 X wires and $2^5$ (=32) Y systems each having 16 wires would be required. This number of wires and cores can presently not readily be accomodated on a card matching the size of other system modules. Secondly, the complete Y system requiring $2^8$ Y lines has to accomodate for example, $2^5$ different bits, i.e., $2^3$ Y lines per bit position. As each bit must be kept separately, separate bus systems are needed for each bit position, but due to the odd exponent (3) in the number defining the number of Y lines per bit position, square decoder matrices are thus not possible (on a power of 2 basis) for the Y wire systems. The optimum case, however, presumes square decoder matrices. To state it differently, 32 different Y wires cannot be unambiguously addressed by 32 different pairs of buses of the square (16 by 16) matrix bus system for the entire Y system, so that the theoretically optimum case is not feasible.

The situation is different if one distributes the memory in four modules so that X=8Y. For the X system one obtains $X=2^7$. As the X decoders are evenly distributed over the two cards, one obtains two 8 by 8 ($2^3$ by $2^3$) decoder matrices for the X lines. The direction of current flow through an X line defines also the purpose of addressing. Current flows in the X wire in one direction for recording and in the opposite direction for reading and clearing. At least one group of 8 decoder bus lines per card should actually be eight pairs of lines. There are correspondingly 32 Y systems of $2^4$ wires each, operating at anticoincidence realizable by 4 by 4 decoder bus matrices, whereby four buses each are actually four bus pairs for obtaining distinction of current direction through the respective Y wires. $2^7$=128 X wires and eight bits can readily be accomodated on a double card module. The dimensions are chosen so that on four modules an additional parity bit can be accomodated.

As each Y line defines two matrix columns, two sense lines per bit position are needed for reasons of noise suppression. They are wired each in a new way more fully explained below. The decoder buses for the X and Y bus systems are controlled externally through predrivers. predecoding the addressing and providing control with regard to the required direction of current flow in the X and Y wires.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figures 4A, 4C:
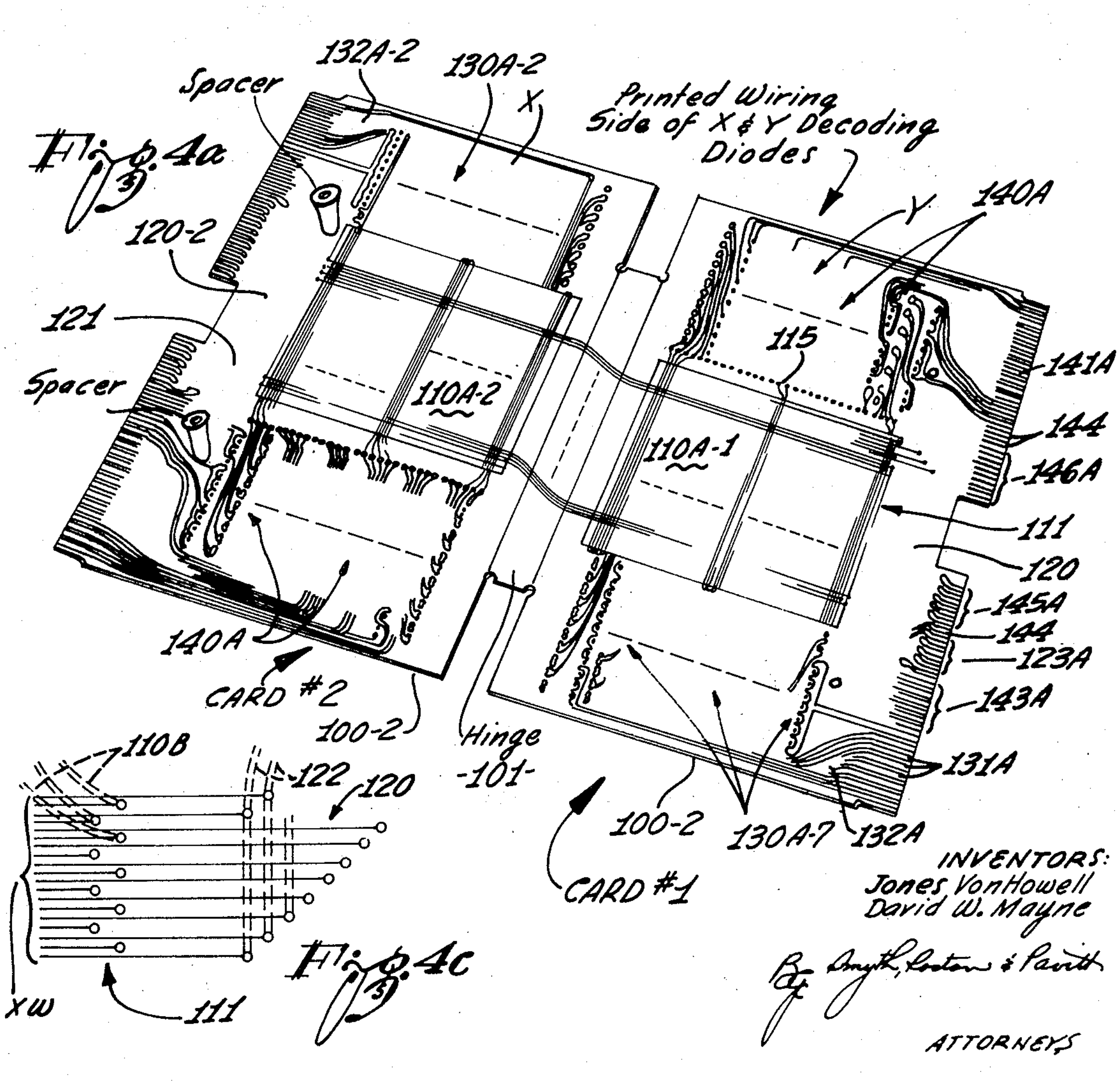
Figures 4B, 5:
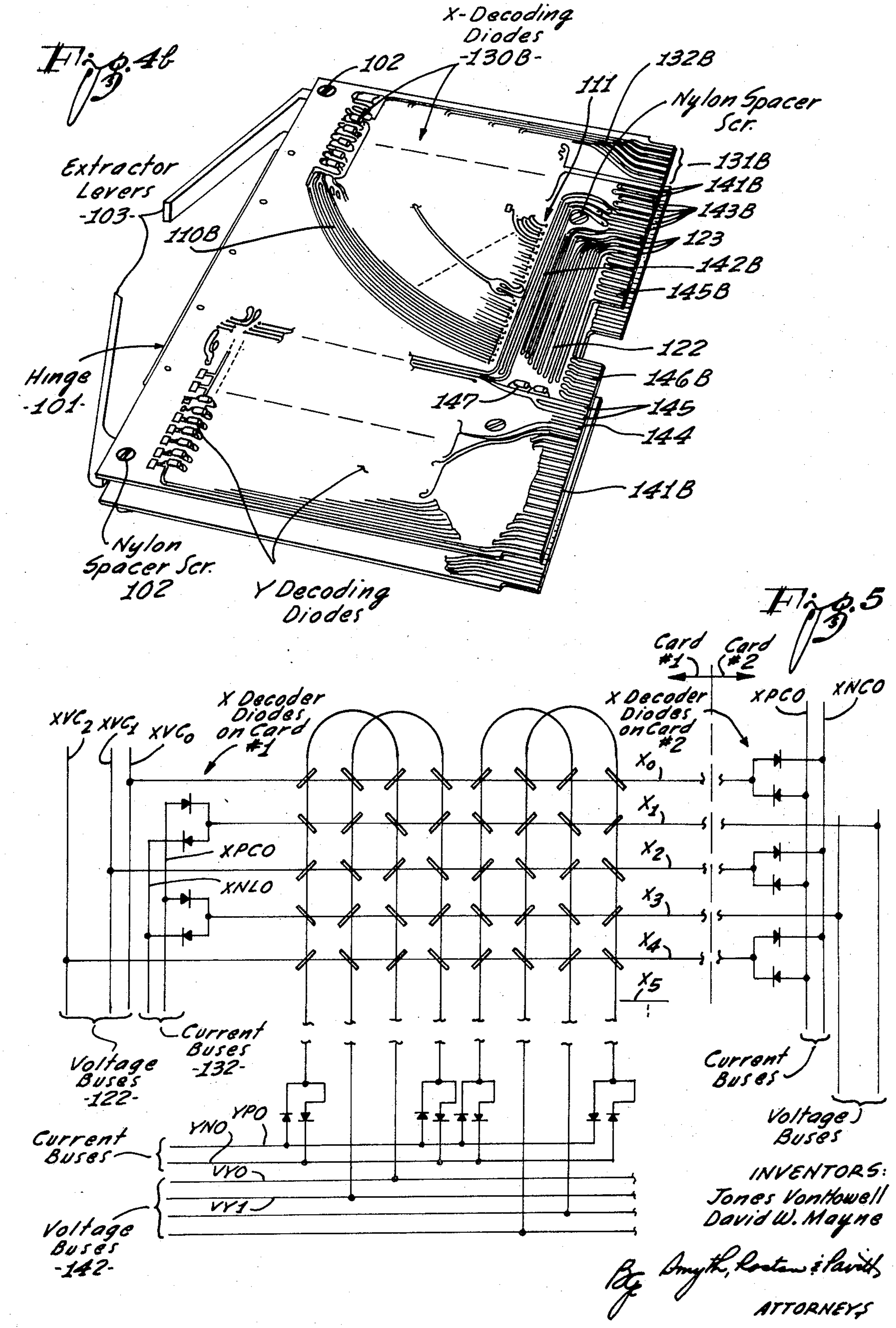

FIGS. 4*a* and 4*b* show in perspective view two different folding positions of the double card memory module in accordance with the present invention; FIG. 4*c* shows conductor connections on a module as shown in FIG. 4*a* and FIG. 4*b*.

FIG. 5 is a circuit diagram used to explain in principle the X–Y wiring and decoding scheme on a module as shown in FIG. 4*a* and FIG. 4*b;*

Figure 9:
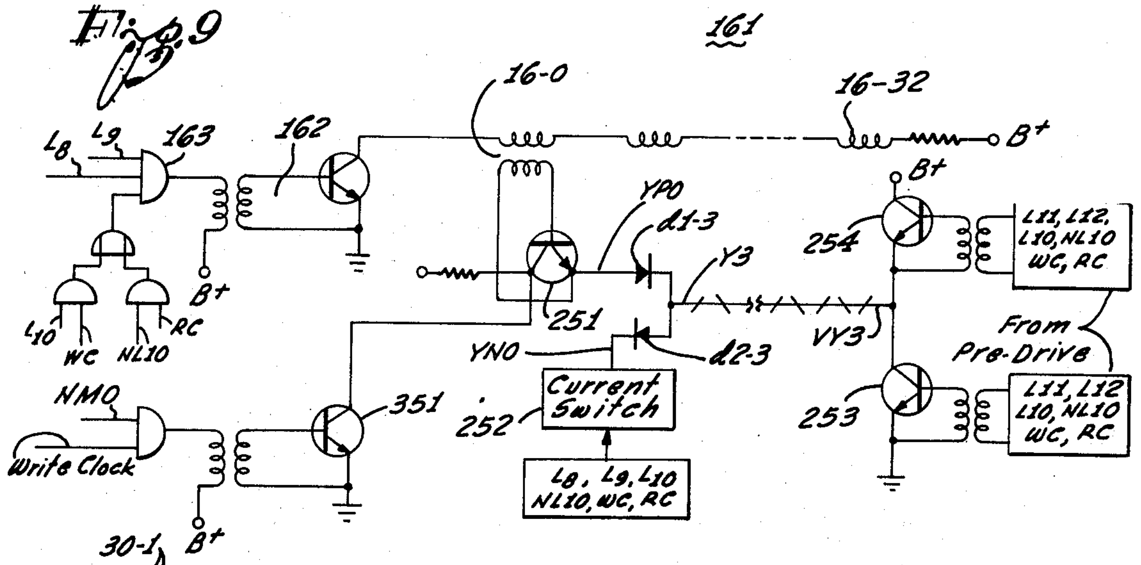
Figures 2, 10:
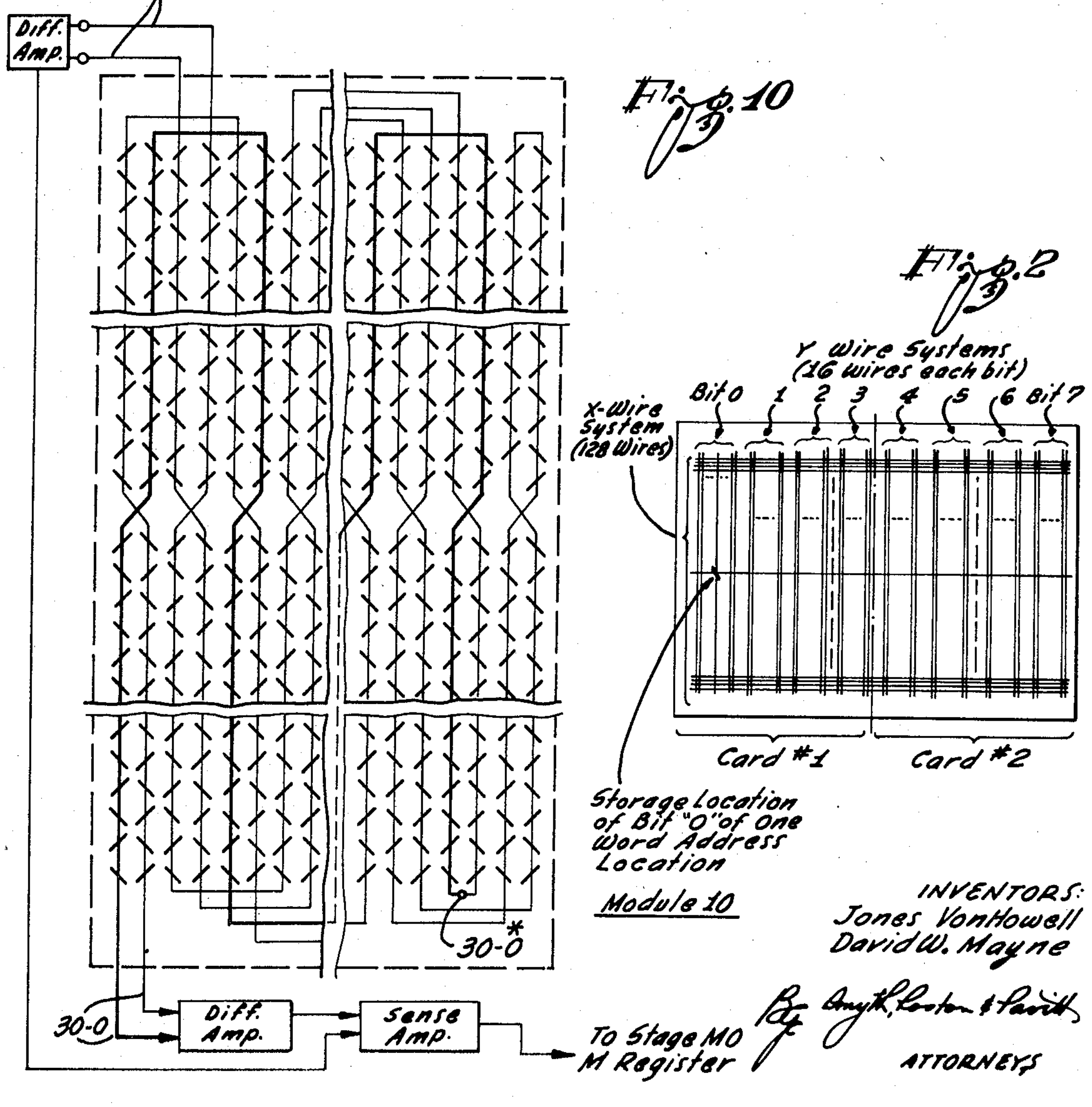
FIG. 2 is a schematic showing of the arrangement of storage locations in one of the memory modules used in the system of FIG. 1.
Figure 6:
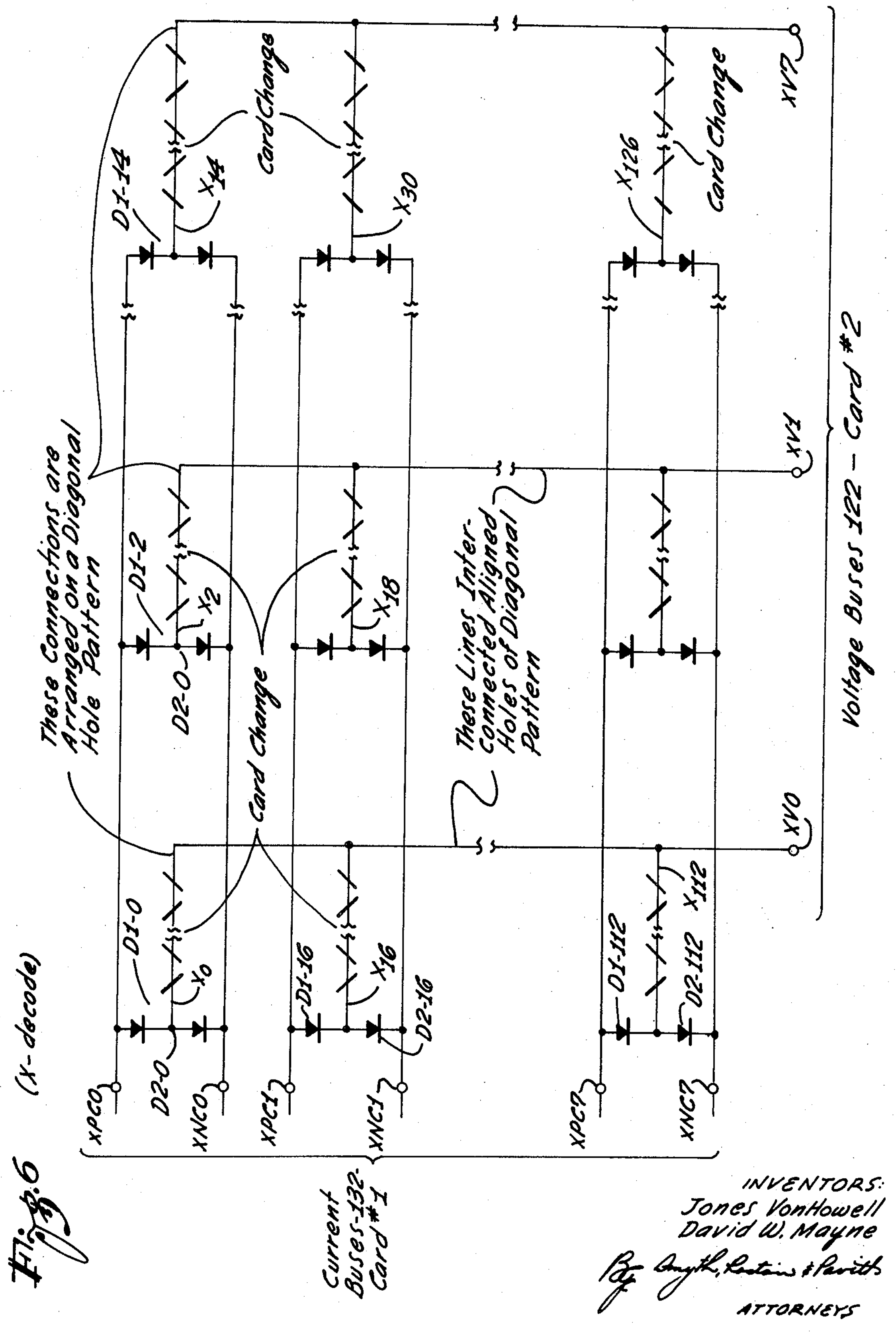
Figure 7:
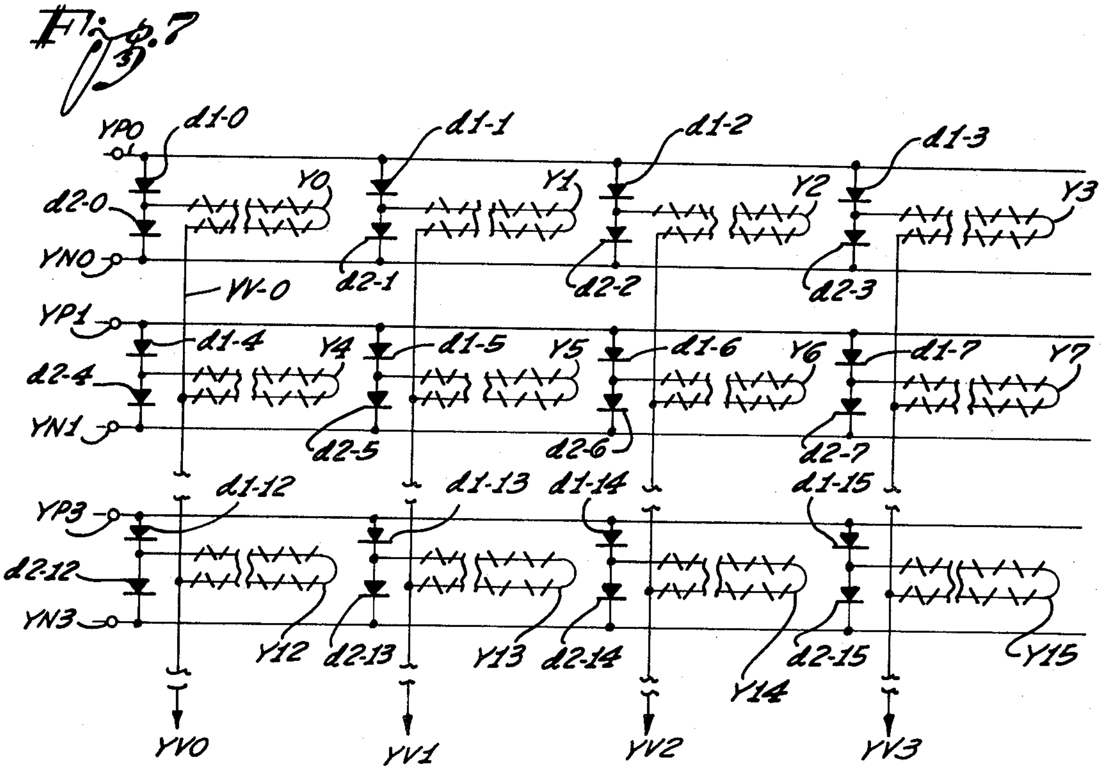
Figure 8:
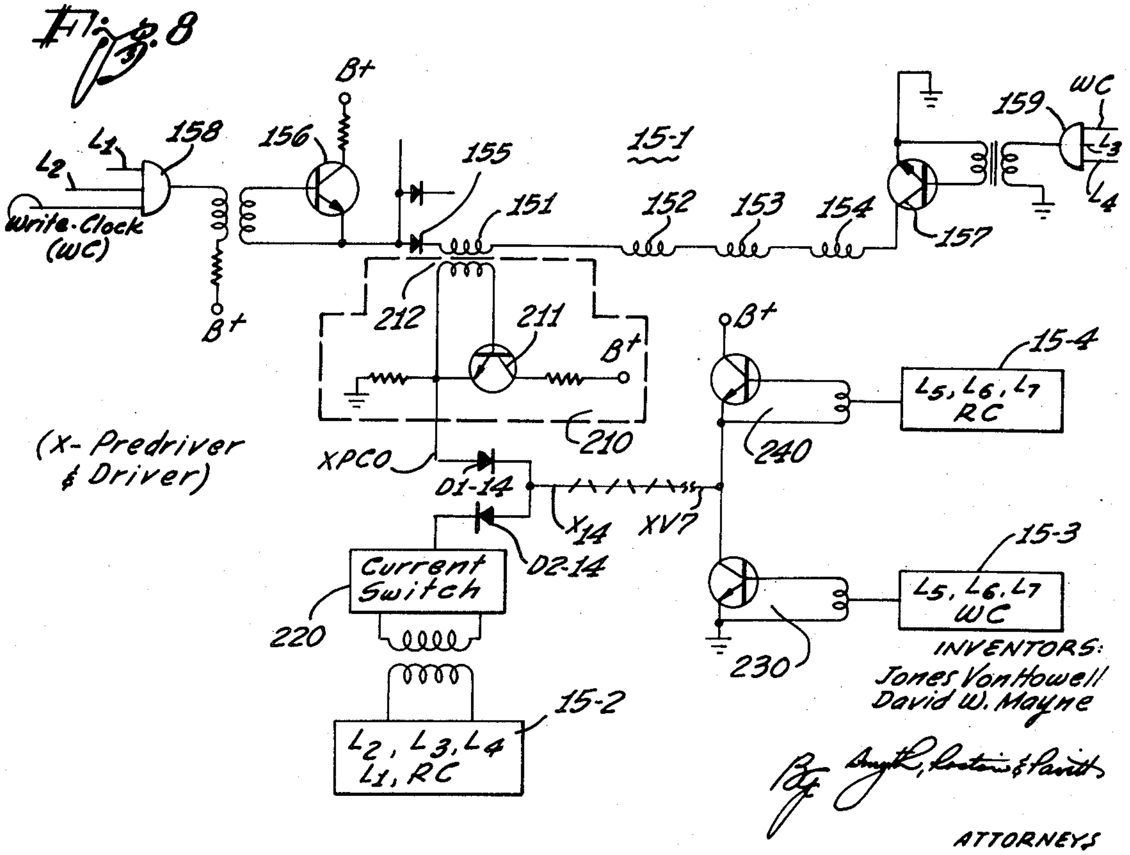

FIG. 6 is a circuit diagram showing the final X decoder system for one-half of all X wires of a module;

FIG. 7 is a circuit diagram showing the final Y decoder system for the Y wires of one bit position on a module;

FIG. 8 is a circuit diagram showing control and predecoder system leading to addressing of one X wire in a module, the figure is used to explain the complete predecoder system;

FIG. 9 is a circuit diagram showing control and predecoder system leading to addressing of one Y wire on a module card, the figure is used to explain the complete Y predecoder system; and FIG. 10 is a schematic wiring diagram showing two sense wires as traversing the cores pertaining to one bit position or plane in any of the modules.

Figure 1:
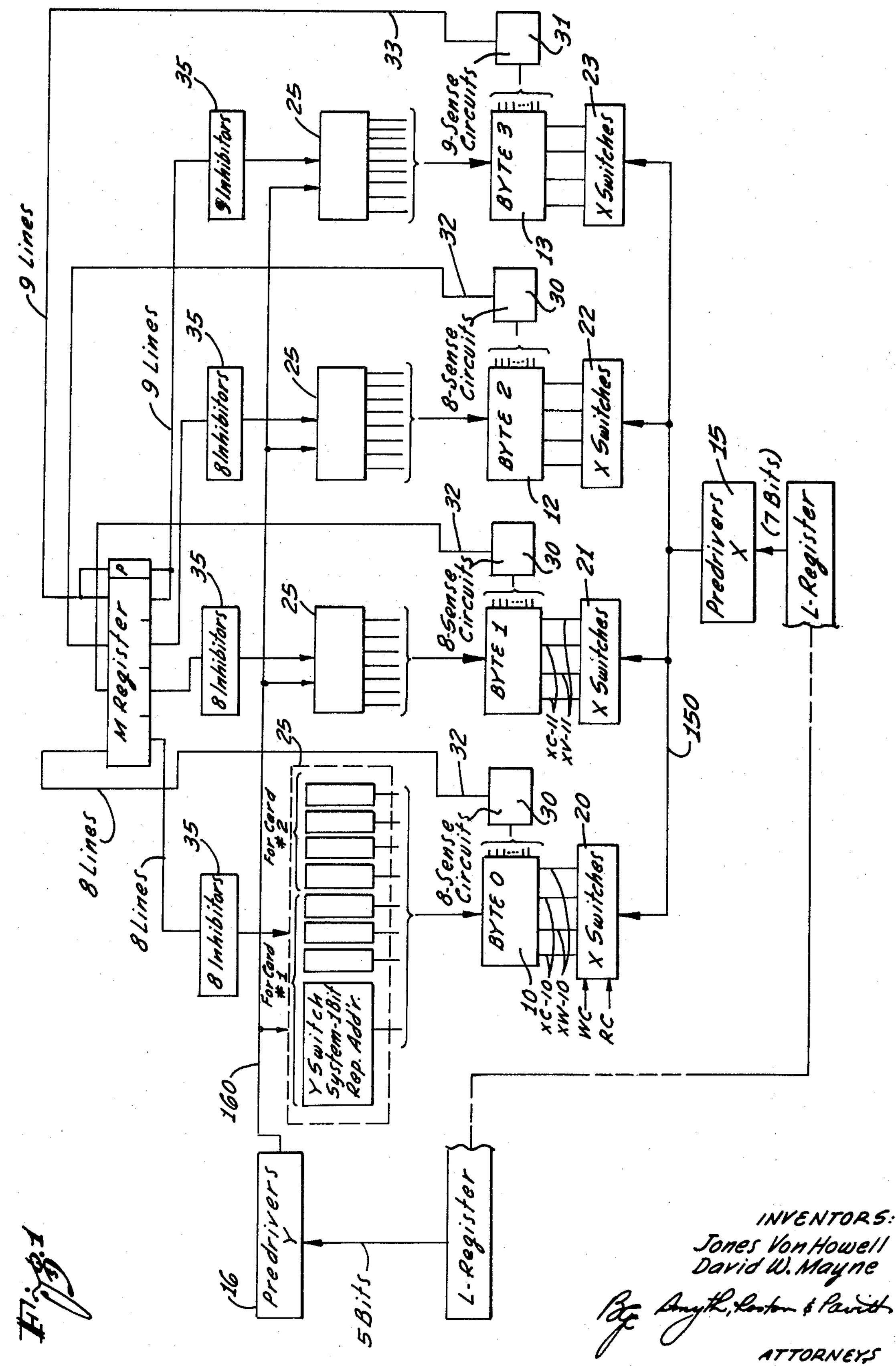
FIG. 1 is a block diagram of the general layout of the basic memory unit improved in accordance with the present invention.

Proceeding now to the detailed description of the drawings in FIG. 1 thereof, there is shown the general layout of a core memory and the circuitry for providing immediate access to the memory. Data to be recorded and stored in memory and data to be read from memory, possibly with subsequent rerecording in case the reading is of the read-restore type, are held in the M register. Data provided externally, for example, by the central processing unit or an input/output device of a computer are fed to the M register in a manner known, per se. For purposes of describing the present invention, it is assumed that the M register holds data to the word level, each word comprising 32 bits or four bytes with eight bits per byte. A 33rd stage of the M register holds a parity bit.

The magnetics of the memory is organized in that each byte is held in a separate module, while each module holds all bytes of the same order of the basic memory. The modules are denoted 10, 11, 12 and 13 and together they constitute the basic memory. Module 10 holds the byte of lowest order (0), i.e., module 10 defines bit locations for bit positions 0 through 7 of any word location of the basic memory. Module 11 holds the byte of next higher order, i.e., it has bit locations 8 through 15 of any word location, etc. Module 13 holds the byte of highest order and the parity bit, i.e., it defines the locations for bits 24 to 33 of each word that can be stored in this basic memory comprised of these four modules. Conventionally, one speaks also of bit planes of a memory, and there are as many "planes" as bits in a word. Each bit plane holds the location of one particular bit of all locations of the memory to the word level. Formerly this terminology had physical significance in that, for example, all core elements for all of the locations of the same bit positions were mounted in one plane. Presently, all byte locations of the same order are within one plane.

It may be assumed that the memory illustrated is a so-called "4 K memory" having, more exactly, $2^{12} = 4096$ different memory locations to the word level. Accordingly, each module holds $2^{12} = 4096 \approx 4$ K bytes. Each memory location to the word level is defined by a 12 bit address code. The current address, i.e., the operating code used for controlling access to a specific memory location is held in an L register receiving addressing codes sequentially from an external source, e.g., the program counter or a memory map of the computer to which this memory pertains. The L register has more than 12 stages, but only 12 thereof are needed directly to address the basic 4 K memory unit. The memory is extended in that additional 4K units are provided so that additional addressing bits are required in order to distinguish among the several 4K units. However, for reasons of simplification the description will be restricted to a 4K memory unit because these units are similar among themselves, but where appropriate, the modifications for the addressing systems which become necessary for a larger memory shall be discussed later in this specification.

Each bit location in each memory module is now defined as a matrix point, which in turn is defined by the intersection of a so-called X wire and of a Y wire. A magnetizable core is disposed in each intersection. Each memory location to the word level has 33 such intersections which are distributed over the four modules. Eight such intersections (cores) constitute the storage place of a byte and are provided together in one of these modules, except that the module 13 has 9 intersections in order to accomodate the additional parity bit. In the following, we shall refer to bit position of a module as the assembly of 4 K bit locations on any module, as each of the bit locations stores a bit having the same position in the respective byte and word. Each bit location in a bit position of a module has a different addressing code, and there is one bit location in each bit position of all modules for each addressing code to which the system can respond.

The X–Y matrix system is established in that seven of the twelve address bits of a word address (as held in the L register) control the X wire system, the remaining five address bits control the Y wire system. The asymmetry of this matrix permits minimization of the components needed for decoding. In view of the fact that the memory is organized in four byte planes, the X-Y system does not have to be repeated for each bit location of all word storage locations. Instead, the X wire system is common to all eight (nine) bit locations of a module, only the Y wire system is repeated for each bit location, so that each memory module has one X wire system and eight (nine) Y wire systems.

The X–Y wire format is representatively depicted for module 10 in FIG. 2. Each module has $2^7$=128 X wires addressable through a seven bit subcode from the L register. Each (eight bit) module has eight Y wire systems of 32 Y wires each. This, however, is not exactly correct, inasmuch as the Y wires are generally connected in pairs so that each such Y wire intersects any X wire twice, reducing the number of physically different Y wires to 16 per bit position. The two different intersections of a (double) Y wire with an X wire are distinguished by current direction in the (double) Y wire, as explained more fully below. Thus, the Y wire system for each bit position of all word locations has only 16 Y wires, addressable through a four bit subcode of the addressing code. The remaining bit for the five bit subcode for the Y systems is used for distinguishing the current direction.

Turning back to FIG. 1, for each word location one X wire per module has to be addressed. As there are four memory modules, four X wires, one per module, are to be addressed by the same seven bit subcode. The seven bits from the L register, therefore, control an X predrive system 15 which includes predecoders driving a coupler system 150 for the control of four sets of X wire switches 20, 21, 22 and 23 respectively for the four modules. The purpose of the predriver system is to provide a plurality of partially decoded addressing signals to all four modules. As a consequence of the partial decoding, a coupler system 150 provides a plurality of different outputs to control the X wire switches for the X wires in each module.

The X predrivers are additionally under control of write clock signals WC and read clock signals RC produced by a control section 50. Read and write clock signals combine timing with definition of purpose of access to the memory location, the address code of which is held in the L register. The coupler 150 can actually be divided in two portions, respectively controlling half of the X wire switches; which half is determined by the signals WC and RC, as half of the X wire switches control flow of current in one direction through all X wires and the other half of the X wire switches control current flow in the opposite direction. The X wire switches similarly designed and constructed, and the appropriate ones in the systems 20, 21, 22 and 23 are controlled concurrently by predriver 15. Details of the predrive control system 15 will be explained below more fully with reference to FIG. 8.

The X switches 20, 21, etc., each control two bus systems XC 10 and XV 10, etc., for X line current and voltage control and leading into the respective modules 10, 11, etc. Each XC and XV bus system has a plurality of bus lines connected to decoders in the module controlling the current flow in either direction through the (one at a time) 128 X wires. The predrive system provides predecoding, actually in several steps; first, it responds to the seven bit subcode of the twelve bit addressing code, and this subcode is subsequently reduced to a two bit code signal energizing two bus lines (per module) of the XC and XV 10 bus system. The remaining, final decoding step, using the two bit code in the bus system to address (energize) one X wire is done in the memory module itself. The bus and final decoder system for the X wires will be explained more fully below with reference to FIGS. 5 and 6, the predecoding will be explained with reference to FIG. 8.

The five bit subcode for the Y wire system controls a Y predriver circuit 16, the output of which is coupled by a coupler system 160 to 33 Y switch systems, one switching system per bit. Details of the predrive system 16 will be explained with reference to FIG. 9. The predrive system 16 is also under control of read and write clock signals RC and WC respectively. The Y switch systems are noted in general with reference numeral 25. Eight Y switch systems are associated with modules 10, 11, 12 and nine of them are associated with module 13.

The Y switch system for each bit position is divisible in two portions, each controlling the current through all of the Y wires of a bit position in one direction. The utilization of the particular portion is part of the five subcode bit decoding process as the direction of current through any Y wire is of addressing significance, one bit of the five bit subcode can serve the purpose of making this distinction. The remaining four bit subcodes are also predecoded by the predrive system 16 so that each Y switch system controls twelve lines of buses system YV and YC leading into the memory modules. There are eight times twelve bus lines accordingly leading to Y decoders in each of the modules 10, 11 and 12, and 9 times 12 bus lines of the YC and YV bus system leading into module 13. As a consequence, each Y wire on a module is addressable by a two biy code to which the five bit subcode for the Y system has been reduced in the Y predrive system. The final decoding for driving current through one particular Y wire (per bit position) is done on the modules. Details thereof are described more fully below with reference to FIGS. 5, 7 and 9.

The Y and X switch systems control current coincidence in the matrix points of the memory system, there being 33 such matrix points for each word location. A magnetic core is disposed in each intersection and is magnetized in a manner determined by the direction of coincident currents in the two intersecting X–Y wires. For recording or writing the Y switch system is additionally subject to selective inhibition control from the content of the M register. During recording in a particular bit direction, current coincidence for particular current directions in the respective two intersecting X and Y wires defining the location represents recording of a "one", while inhibition of coincidence represents recording of a "zero", as the system is controlled to record "zeros" in all bit locations of a particular word address location prior to recording information.

As the bit location distinctions are made through the Y drive system, enabling and inhibition of the Y drive addressing systems is used for recording "ones" or "-zeros" in the respective bit locations. There is accordingly an assembly of 33 inhibitor circuits collectively designated by numeral 35 for each memory module and which permit or inhibit current to flow in the Y wires as controlled by the Y switches, the selection being under control of the predriver 16 in accordance with the addressing control from the L register.

During reading the inhibition control 35 is ineffective. In addition, a sense circuit is associated with each bit position for all word locations, there being then eight sense circuits collectively designated with numeral 30 for the modules 10, 11 and 12, and nine sense circuits 31 are associated with module 13. Eight output lines 32 lead from each of the sense circuit groups 30 to the respective bit positions of the three low order bytes in the M register for input control. Nine output lines 33 lead from sense circuit group 31 to the input for the bit positions of the highest order byte location of the M register and the parity stage P thereof.

Figure 3:
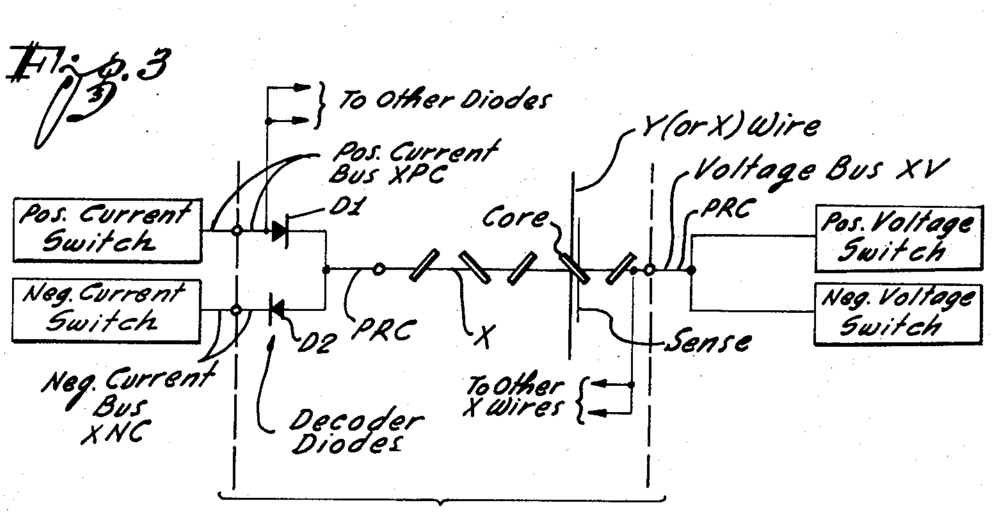
FIG. 3 is a schematic wiring diagram used to explain addressing procedure for a single bit storage location.

FIG. 3 illustrates representatively a bit storage location, using a particular core being so designated and being traversed by a representative X wire, a Y wire and a sense wire. The X wire can be traversed by a current in either direction, i.e., in the drawing from left to right or from right to left. Each X wire is connected to a pair of decoder diodes D1 and D2, uniquely associated with the particular X wire, and being components on the particular module to which the X wire pertains. Diode D1 has its cathode connected to the X wire while its anode connects to a so-called positive current bus XPC, being part of the X bus system XCV and being partially on the particular module. The particular positive current bus XPC leads to the anodes of other decoder diodes for respective other X wires on the same module.

Diode D2 has its anode connected to the X wire and its cathode connects to a so-called negative current bus XNC, also part of the XC bus system and being partially on the particular module. Other anodes of other decoder diodes connect to the same bus XNC. The other side of the X wire connects to a voltage bus XV, to which also connect other X wires of the module. The XV bus pertains also to the XV bus system for the module and is partially on the module. XPC, XNC and XV are thus buses which are part of the decoder system on the memory module. They include input connections for them from outside the module. Moreover, the particular energization of the XPC bus and of the XV bus is the result of a two bit code to which the seven bit X subcoder has been reduced. Energization of the particular combination of buses is then the final decoding step to energize a particular X wire in a particular current direction. The dotted lines in FIG. 3 denote symbolically the portions of the connecting system as described as being on the module to which the illustrated X wire (and 127 other X wires) pertains. The buses, such as PXC, NXC, and XV are connected to the X switches outside of that particular memory module, and on other circuit modules mounted preferably in close proximity to the particular memory module and connected to it through chassis back wiring. Each bus PXC is under control of a positive current switch which is part of the X switch system; each bus NXC is under control of a negative current switch. Each voltage bus XV is selectively under control of a positive and a negative voltage switch.

For current to flow through the X wire, a complementary pair of voltage and current switches must be turned on. The selection of switches defines the X wire, the type of polarity of association defines the direction of current. For current to flow through the X wire, in the drawing from left to right, both the positive current switch and the negative voltage switch illustrated must be turned on. The positive current switch and the negative voltage switch pertain also to other X wires, however, a particular combination of positive current switch and negative voltage switches perform switching function only for that particular X wire. The selection of the desired combination of current and voltage switches is part of the predecoding performed by the X predrive system 15 under control of the L register. A current will flow in that direction by operation of the positive current and negative voltage switches during reading or clearing where the particular core is switched to the "zero" state.

In order to permit current to flow through the X wire in the opposite direction, the positive voltage switch and the negative current switch have to be turned on. The particular combination is selected by the predrivers under control of the L register and the write clock. The negative current switch leads through connector contacts and a negative current source to which it will connect other X wires. The other end of the X wire connects through a printed circuit portion of bus XC and through chassis back wiring to a positive voltage switch, outside of the memory module to a positive voltage switch, outside of the memory module to a positive voltage source.

The core as identified in FIG. 3 is traversed also by a Y wire which is governed by a similar set of voltage and current switches connected thereto through buses and decoder diodes pertaining to the Y wire system. Finally the core is traversed by a sense wire. A voltage is induced in the sense wire during the read phase when the direction of, preferably, saturation magnetization in the core is reversed.

As stated, the "zero" state is induced in the core by current in the X wire requiring the particular combination of positive current switch and negative voltage switch to be turned on. Concurrently the Y wire must then be traversed by a current flowing, in the drawing, in up direction in order to provide signal coincidence, i.e., adding magnetic fields of sufficient strength for causing the zero state defining magnetization to be induced in the core. This occurs in the read and/or clear phases of a core memory cycle. A voltage pulse is induced in the sense wire if a "one" was held in the magnetic core and if during the read phase the magnetization of a core is, in fact, reversed. The clear phase is magnetically similar to the read phase except that the resulting voltage in the sense wire is suppressed. For recording a "one" during the record phase of a memory cycle the direction of current flow must be reversed in both wires. A zero is recorded during the record phase by not recording a "one" in that current flow in the Y wire is inhibited.

Turning now back to FIG. 1, the overall operation is as follows. For a memory read-restore operation, an address code is set into the L register, the X and Y predrivers are controlled in accordance with the demanded read operation and they control the selection of the appropriate X and Y switches. In order to obtain addressing of 33 bit locations, one in each of the eight (nine) bit positions of each of the four memory modules, coincidence currents are produced in each of the pairs of intersecting X and Y wires opposite to the one used for recording a "one". Hence, each bit location is reset to "zero". The sense wires for each bit position wherein the core in the respective bit location is reset from state "one" to state "zero" receives a pulse, while absence of such resetting (because the particular location holds a "zero") does not produce such a pulse in the respective sense wire.

The sense circuits 30 (31) strobe the sense lines leading through the respective core matrices and the 33 bits of the word are gated into the M register. Parity is checked and, if correct, the restore phase can commence; the predrivers 15 and 16 are then controlled for recording, i.e., the current in each of the X and Y wires energized during the read phase is reversed, whereby additionally, however, for each bit position where a zero is to be recorded current in the respective Y wire is actually inhibited. By operation of other X and Y switches and under cooperation with the inhibitor circuits 35, the content of the M register is thus recorded back into the same word location the bit locations of which are distributed over the four modules 10, 11, 12 and 13.

The full clear-write type memory cycle is similar to the read-restore cycle in several aspects. The clear phase is the same as the read phase (resetting of all bit locations of these addressed word locations to "zero"), except that during the read phase sense circuits do not strobe the sense wire, the content of the memory address location is merely erased and not set into the M register. During the succeeding write phase, the existing content of the M register (previously provided, for example, from the computer), is written into the same location using, however, different X–Y switches as the current, where produced have different directions in the clear and the record phase. For partial clear-write, the situation is such that the M register holds initially three or less bytes to be written into a particular memory location while the remaining byte or bytes in that memory location are not to be substituted by new information. Therefore, during the first read phase the bytes to be retained are read from the respective modules by the respective sense circuits and set into the particular locations of the M register. The bytes for which information has to be substituted are not sensed, and, therefore, are destroyed during the read operation analogous to a clear operation. During the then succeeding record phase, the entire content of the M register, partially having been provided externally, partially having been read from the location, is recorded into the same memory location. Of particular interest are now the memory modules 10 through 13, each holding information to the byte level, and to them we now turn.

FIGS. 4_a_ and 4_b_ illustrate a memory module. Each memory module is comprised of two printed circuit cards such as 100–1 and 100–2. It is a significant feature of the invention that these two cards, which together form a single module, are identical in all respects to the extent that the module can be placed in the chassis in two different positions. Therefore, the description of a single card suffices to describe the modules and the identification No. 1 and No. 2 appended to reference numeral, will be used only if for reasons of facilitating the understanding of the cooperation of the two cards. The particular elements on the cards have to be identified with regard to their specific location.

Each of the cards 100 has two long and two short edges. A polypropylene hinge 101 is respectively connected to one long edge of each of the cards which permits the two cards to be folded "open" as illustrated in FIG. 4_a_ or to be "closed," as shown in FIG. 4_b_ in the "open" position of the module the two cards are coplanar and exposes all sides; in the "closed" position of the module the cards establish a plane-parallel or stacked position. The double card module can be mounted to the chassis of the system. The outer side of the hinge forms the front side of the inserted module. Spacer bolts 102 maintain the two cards in closed position. The bolts can be removed or loosened for opening the module. A pair of extraction levers 103 is provided to facilitate removal from and insertion of the closed double card module into the particular chassis.

The respective other long edges of the two cards are called terminal edges and therealong, on both sides thereof, are provided with printed circuit terminal etchings or connector contacts. These printed circuit contacts make individual contact with terminal connectors (not shown) as conventionally used for printed circuit cards. Other modules (namely, those holding the X and Y switches) are mounted to the same chassis and they have similar terminal connectors. The chassis' back wiring connects the terminal connectors of the memory module cards to the terminal connectors for the other modules.

Turning now to details of the cards, the side of either card which faces the respective other card in the closed position, will be identified by a character A appended to the respective reference numerals used for identifying elements possibly extending on both sides of the card. The respective other side of a card which is exposed even when the double card module is in the folded closed position will be denoted with B, and elements identified by reference numerals to which B is appended are mounted to the respective side B of a card.

Each card has a centrally, but not quite symmetrically located area 110A over and along which are suspended horizontally the X, Y and sense wires, as well as the individual cores forming the core memory matrix for a byte of a 4–K memory unit. Areas 130A are provided with printed circuit etchings (for the X wire system), providing circuitry for one-half of the decoding diodes for the X wire system of the module. On the opposite side (B) of the same card, area 130B thereof there is placed another portion of the circuitry for the same half of the decoding diodes for the X wire system; one-half of the decoder diodes themselves for X wire system of the module are mounted on area 130B of either card.

The area 110B of either card is provided with printed circuit etchings, some of which connect to the diodes in area 130B, others terminate along the border area between areas 130B and 110B, and connectors traversing the card connect these etchings to printed circuit etchings on area 110A. All of the etchings on area 110B of each card can be considered extensions of one-half of X wires of the modules. Hence, 64 connecting lines for the X wire system pass over area 110B. Looking for a moment at FIG. 3, the diodes D1 and D2 thereof pertain to those mounted on area 130B and part of the printed circuit etchings on areas 130A, 130B and 110B provide the connection between diode and X wires proper. Printed circuit etchings 132A and 132B are the end portions of the several X current buses which lead to the X decoder diodes on the cards. The buses themselves including connectors, etc., begin outside of the module.

A double row of apertures 111 are provided along one edge of area 110B and the printed circuit etching lines on area 110B terminate in these apertures. They establish feedthrough connections to the side A and connect in turn to 64 of the X wires running over the area 110A. A fragment view of this end of several X wires is shown in FIG. 4c. It is now a significant feature of the invention that these X wires connecting to connectors in the apertures of double row 111 of a card and after having traversed the area 110A do not terminate on the same card. Instead, they run over the inner face of hinge 101 and cross over to the area 110A of the respective other card. Thus, 64 X wires begin, so to speak, at the double row 111 of each card and crossover to the other card, whereby a wire of the altogether 128 X wires extending over areas 110A–1 and 110A–2 and beginning, for example, in an aperture of double row 111–1 is adjacent to two wires beginning in apertures of double row 111-2, i.e., on the other card.

On each card there are eight rows of eight holes each denoted in general with 120 (denoted 120–1 on one card and 120–2 on the other). These apertures on each card from the end point of the 64 X wires which originated in the apertures 111 of the respective other card. The 64 X wires terminating in apertures 120 are organized, through the aperture arrangement, into eight rows of eight wires each and connectors through these apertures terminate the wires in eight printed circuit buses 122 on side B, particularly in area 120B of the respective card. These altogether 16 buses (eight on each card) form the so-called voltage bus system for the X wire system of which XV (FIG. 3) is a part. The individual voltage bus lines on a card will later on be distinguished by XV0 to XV7.

Thus, as one can also see in FIG. 5, each card has half of all the X decoder diode pairs for the module, i.e., 64 diode pairs being mounted on area 130B of each card. 64 printed circuit connections lead, for example, from area 130B of card No. 1 and the diodes thereon over area 110B to the rows 111 of card No. 1. From there 64 X wires, interspaced with 64 additional X wires run over the areas 110–1A and the area 110–2A (of card No. 2). The 64 X wires coming from card No. 1 terminate in the eight diagonally arranged groups of eight holes each, and collectively denoted 120 of card No. 2. On the other side, side B, of the card No. 2, one wire of each group is connected to one of altogether eight voltage buses 122 on card No. 2. The same type of connecting pattern is repeated for the respectively interspaced 64 X wires with the role played by each card being reversed. Therefore, the two cards each are provided with the same complete X wire of the module as each X wire crosses over from one card to the other at the hinge, but diodes and voltage buses are divided and each card holds half of the total number needed for the module.

Considering now again each card individually, the eight voltage buses 122 on side B of a card terminate in eight printed circuit connectors 123 which are arranged along the terminator edge of the card. Half of the buses lead directly to terminal etchings (123B) on the card, the other half connects through interspaced apertures to terminal etchings on side A of the card (123A). These buses 122 with connectors 123 for each card are half of the entire X voltage switch buses of the module, (see representatively XCV in FIG. 2). From the printed circuit connections pertaining to the decoding diodes in area 130A and 130B of any card, further printed circuit etchings 132A and 132B lead to the terminal edge of the card along which there are printed circuit connector contacts 131A and 131B. The printed circuit connectors 131A and 131B are aligned across the edge of the card and there are eight of each of them. They are respectively also ports of the positive and negative current buses for the X wire system, each card again holding half of the current bus system needed for the entire module. Buses PXC and NXC were representative examples shown in FIG. 3. The circuit buses of which each of the printed circuit etchings 131 and 132 are portions of individual bus lines which will later on be denoted by PXC–0 to PXC–7 and NXC–0 to NXC–7 for any card and which begin in predrive modules. This completes the description of the physical location of the X wire, X decoding and X bus system as far as the double card module is concerned.

Area 140A of a card holds printed circuit etchings for the Y decoding diodes. The diodes themselves and additional circuit etchings for the Y decoder systems are on area 141B of a card registering with area 141A thereof. Printed circuit connector contacts 141A constitute a portion of the negative current buses for the Y wire system and lead to the Y decoders. Positive Y current buses from the diodes lead to printed circuit connector contacts 141B. Printed circuit as well as feedthrough connections along the boundary 115 of areas 140 and 110 provide origin as well as termination of the Y wires themselves.

The Y wires each lead particularly from the border 115 of areas 140A and 110A almost to the border of areas 110A and 130A and loop back towards area 140A. Therefore, the Y wires each traverse the matrix twice. However, the same Y wire does not establish neighboring "Y columns" of that matrix, but another "Y column" (one-half of another Y wire) is disposed between two columns as defined by a single Y wire. This arrangement can be seen best from FIG. 5.

The one end of each Y wire connects to a pair of diodes on area 140B, the connection includes printed circuit etching on this area and/or on area 140. Each Y wire as looped back does not connect to the decoding diodes again but to printed circuit connections pertaining to a voltage bus system YV. Each card of an eight bit module holds four bit positions for each of the 4–K word locations of the basic, four module memory unit. For each bit position a four voltage bus system is provided, in parts included in etchings 142B, and leading to printed circuit contacts 143A and 143B. For reasons of finding suitable connector space, some individual voltage bus printed circuit contacts are not placed together with the others (142) and they are denoted with numeral 144, to be found in several places along the contact edge of a card. Inasmuch as the module may also hold a parity bit, one additional current and voltage Y bus system must be provided requiring, however, only half the number of Y current buses on each card, as each card holds only 2–K parity bit locations.

It will be recalled from FIG. 3 that one needs also positive and negative voltage buses (leading to positive and negative voltage switches respectively) but that division is not made on the memory module but on other module cards holding the voltage switches. On the other hand, the separation in positive and negative current buses is made on the card (contacts 141, etc.). The separation in positive and negative buses on or outside of the memory module is merely a matter of finding space for the connector contacts. Thus, double voltage bus systems for the Y wires could be provided on the card in principle, but for the chosen overall dimensions of the card, the division into positive and negative voltage buses was not possible to be made on the card. If one chooses a different size card, that division might well be possible.

For a regular eight bit byte module each card holds 4–K bit locations for each of four bit positions of the memory system. For each bit position a separate sense wire system is needed traversing the core matrix in a pattern which will be outlined more fully below with reference to FIG. 10. Each bit position has actually two sense wires and the two sense wires for each bit terminate in four printed circuit connectors such as 145A, 146A, 145B, 146B. For reasons above, it is economical to provide the printed circuit pattern on each card so that the respective module can serve for nine bits through space for only eight is used in three out of four cases of employment. Thus, each card should be capable of accomodating half of the locations, i.e., 2–K locations for the respective parity bits. Each card should, therefore, accomodate an additional sense system of four sense wires and the four resulting printed circuit connectors are placed next to these four groups of connectors 145A and B and 146A and B. Each card, in addition, is provided with temperature sensing diodes 147, there being several printed circuit connector contacts 148 leading to them in order to provide signals making it possible to control the biasing level for the system in accordance with the temperature of the printed circuit card, but outside thereof.

The general layout of a 4–K memory system has been described with reference to FIG. 1 and the physical layout of a 4–K byte module has been described with reference to FIGS. 4*a* and 4*b*. The electric circuit for that memory system shall now be described in greater detail, and with reference to FIG. 5 through FIG. 10. Each double card memory module stores one of the four bytes of all $2^{12}$ ($\approx$4K) words which can be stored in the basic memory unit, and each card stores one-half of each byte that can be stored in the respective memory module. The storage locations for the individual bit positions are arranged in an area of a matrix formed by $2^7$ rows ($12^8$ X wires) and $2^5$ columns (16 Y wires, 1 per two columns). The X wires are common to all bits of a byte in a double card module, the Y wires systems are respectively unique for each bit position and provide bit position distinction, and, therefore, bit value distinction.

A word address for a basic memory unit is defined by a 12 bit code, additional addressing bits can be used to distinguish among general memory units of four modules each. A seven bit subcode is used to address-control one of $2^7$=128 X wires and, the remaining five bits are the Y system subcode to be used to control of $2^5$=32 columns. As each individual Y wire defines two columns, there are then $2^4$=16 Y wires per bit position. Therefore, X and Y subcode decoding is carried out as a two step process; the subcodes are predecoded in the predrive circuit, the final decoding is made by the diodes on the circuit module for each byte itself. The final decoding for control of the X wires is made for half the X wires on each card. The final decoding for control of the Y wires is made for as many bit positions as there are on each card.

The decoding process in general involves the following. The seven bit X wire system subcode as held in the L register must be converted into control signals for providing current to one of 128 different X wires and for each of four modules. The five bit Y code has to be converted into control signals to control the current flow in one or the opposite directions through one of 16 Y wires for each of the 33 bit positions that make up a word location. If the decoding were carried out entirely outside of the module, then for the X system 128 connections from the outside would have to lead into a double card module, and 8 × 16 = 128 wire connections would have to lead into the module (16 more for the module holding the parity bit) so that the eight (nine) intersections are controlled for providing access to the eight bit locations of the particular addressed byte. One can, therefore, see that in case the address is decoded completely outside of the module, one would need 256 (272) connections into the module solely for addressing. Consequently the module would be rather large just for the purpose of providing the necessary number of module inputs, while on the other hand, no mounting space for any decoder diode were required on the memory module cards. Alternatively, a minimum number of lead-in connections for a memory module would suffice (namely 12) of the addressed were decoded entirely on the memory module cards. This, however, would require 64 X decoders with seven inputs each on each card and four (five) times 32 Y decoders with five inputs each. Here then, the mounting space required would be rather large with only a few input connections.

However, if the address codes are predecoded outside of a memory module and only final, matrix, decoding for each of the X and Y subcodes is provided on the module cards themselves, then the number of connections leading into the module can be made commensurate with the space required for the remaining decoders on the cards. Looking at FIGS. 4*a* and 4*b*, one can see that along the rear edge of each card is available for providing a particular number of printed circuit contacts. That number is related to the area size of the card to the extent that the degree of rectangularity of each module is a fixed system parameter. The size and dimensions of the modules themselves is determined by the size of the modules used in general in the system. The area of each card permits placement of a particular number of circuit elements to be used for decoding. Therefore, the decoding system employed, with predecoding and final decoding as separate steps is such that the connection between the output of the predecoding circuitry and the final decoding systems on a card size are compatible with other modules of the system to make full use of the available edge-space for placement of input connection contacts for the module, while the existing mounting space on the module cards if sufficient to provide for the remaining decoding and, of course, the X–Y matrices proper. In the following, the decoding on the module cards shall be described first for each X and Y wire systems, respectively succeeded by the description of the predecoding, predrive and drive systems.

Turning first to FIG. 5, there is shown a portion of the core system for one bit position. The cores are arranged respectively on an intersection of a Y wire and of an X wire. The intersections illustrated are some of the matrix points for the $2^{12}$ bit locations of each bit position) as defined by one of the four matrices for the four bit positions on a memory module card. With regard to the array of Y and X wires, there are defined two diagonal directions. The cores are threaded through the wires at the intersections to extend in alternating ones of the two possible diagonal directions, i.e., for each of the cores on an inner matrix point, four adjacent cores along the respective X and Y wire have an orientation different from the orientation of the core at the matrix point considered, but they have the same orientation among themselves.

The X wires are denoted with $X_0$, $X_1$, $X_2$, X etc., up to $X_{127}$. The X wires with the even subscript identification, for example, are connected to the X current buses and decoder diodes on card No. 1, and they terminate in eight voltage buses 122 on card No. 2. The X wires with odd subscript identification are connected to the X current buses and X decoder diodes on card No. 2, and they terminate on the printed circuit card No. 2 in eight voltage bus lines.

Turning now to FIG. 6, there is illustrated one-half of the X wire system, as connected to the decoders on one module card, for example, card No. 2, and to the voltage buses on the other card, card No. 1. There are eight voltage bus lines, XV0 to XV7 which come from eight printed circuit contacts 123 of card No. 2. The X wires, $X_0$, $X_2$, $X_4$, $X_6$, etc., through $X_{14}$, for example, all form a group which terminates in one of the eight diagonal hole patterns 120–2 and are respectively connected to the eight buses 122–2, denoted individually in FIG. 6 by XV0 to XV7. The connecting pattern is repeated for the wires $X_{16}$, $X_{18}$, etc., through $X_{30}$, so that the eight wires $X_0$, $X_{16}$, X . . . $X_{112}$, all connect to voltage bus XV0; the eight X wires $X_2$, $X_{16}$, . . . $X_{114}$ connect to voltage bus XVI, etc.

The other ends of these X wires of FIG. 6 connect to the X decoders on printed circuit module card No. 1 of this double card memory module. The connection of an X wire to one particular diode pair of the decoders actually includes a connection of that particular wire through one aperture in the double row 111–1 on the card (see FIG. 4*a*, 4*b*). It further includes a printed circuit etching which leads across area 110B–1 and from there to two decoder diodes mounted in area 130B of card No. 1.

The 64 decoders on card No. 1 are arranged in an eight by eight matrix pattern. This will also be called the X—X matrix of a module card. Each matrix point of the X—X matrix has a decoder unit comprised of a pair of diodes. An anode-cathode junction of the two diodes connects to a particular X wire. Therefore, the two diodes D1–0 and D2–0 in matrix point 0 of the X–X matrix are connected to the wire $X_0$. The two diodes D1–2 and D2–2 of the matrix point 2 are connected to the wire $X_2$, etc. Diodes D1–14 and D2–14 connect to wire $X_{14}$. The eight diodes D1–0, D1–2, . . . D1–14 now connect to a printed circuit bus line XPC0 of the bus system 131 which includes the printed circuit connections 132 on areas 130A and 130B of a card leading from printed circuit contacts 131 to the diodes on area 130B of the card. XPC0 is a positive current bus and includes connections beyond the memory module card to a positive current switch. The eight diodes, D2–0, D2–2, . . . D2–14 connect to a negative current bus line XNC0 analogously connecting to a negative current switch outside of the memory module card. Hence, positive and negative current buses XC0 connect to eight decoder diode pairs and X wires and the respective X wires connect respectively to the eight different voltage buses XV0 to XV7.

There are now eight pairs of such current buses XPC0, XNC0, XPC1, XNC1, XPC2, XNC2 . . . , XPC7, XNC7. The eight X wires $X_0$, $X_{16}$, . . . , $X_{112}$ connected to voltage bus XV0, connect respectively to the positive current buses XPC0, XPC1, . . . , XPC7 via diodes D1–0, D1–16, . . . , D1–112. The same eight X wires connect respectively to negative current buses XNC0, XNC1, . . . , XNC7 via diodes D2–0, D2–16, . . . , D2–112.

This completes the X—X decoder matrix systems for half of the X wires, using 16 current buses, in pairs, on one card, and eight voltage buses on the other card. That system is, so to speak, symmetrically duplicated for the other half of the X wires. The double card module thus has a final X-decoding system requiring eight voltage buses and 16 current buses on each card or 48 input connections total.

For recording on any core along any particular X wire, the X wire is selected in that a positive voltage signal is applied externally to one of the eight current bus lines XPC0 through XPC7 of one card while a negative voltage signal is applied to one of the voltage buses $V_0$ through $V_7$ on the other card. This selection of a pair of current and voltage bus lines is, what was referred to above the two bit code applied to each module for final decoding thereon for X wire addressing. For clearing or reading a negative signal is applied to one of the current bus lines XNC0 through XNC7 of one circuit card and negative voltage is applied to one of the voltage bus lines XV0 through XV7 on the other circuit card. The current and voltage bus lines are under control of current and voltage switches constituting the activated output elements of the X-predecoder system to which we now turn.

It has been explained above with reference to FIG. 6, that on each module there are 128 decoders arranged in two matrices. For each matrix there are eight positive and eight negative current input buses forming the, for example, rows of the X—X matrix and eight voltage buses forming the columns of the matrix. As the distinction between positive and negative current buses is one of purpose and has no immediate addressing significance, one can see that the X system of each module requires activation of one of 16 positive or negative current input buses and of one of 16 voltage buses at complementary polarity.

Consider now the drive system shown in parts in FIG. 8; for example, a particular X line, denoted X 14, is connected to the decoder diodes D1–14 and D2–14 in correspondence with FIG. 6. The anode of decoder diode D1-14 is connected to the bus XPC0, (together with seven other diodes as was shown in FIG. 6), while the other end of the X wire connects to the voltage bus XV7 (together with seven other X wires). The decoder diode D2–14 is connected (together with seven other decoder diodes) to negative current bus XNC0. Outside of the memory module, a positive current switch 210 is connected to bus XPC0, a negative current switch 220 is connected to bus XNC0 and a negative voltage switch 230, as well as a positive voltage switch 240, are connected to voltage bus XV7. There must be eight switches of each type for 64 X wires. As there are 128 X wires, one could duplicate the entire system. Alternatively, one could, for example, connect bus XV7–2 of the other card to the same pair of switches 230–240, so that switches 230 and 240 actually control 16 X wires each, the selection still being made by one of the eight current switches connected to the eight positive (or eight negative) current buses from one card of the module or by one of the eight current switches connected to the eight positive (or eight negative) current buses from the other card of the same module.

The selection of the appropriate X wire, for example, for the record case, is done by selecting a combination of one of the 16 positive current switches and of one of the negative voltage switches. This is done by the predecoding process. If one defines the seven bit addressing subcode for the X system as bits $L_1$, $L_2$, . . . , $L_7$, then bits $L_1$, $L_2$, $L_3$, $L_4$, (defining a four bit, 16 choice subsubcode) may be decoded to drive the 16 positive current switches, and bits $L_5$, $L_6$, and $L_7$ are decoded to select one of eight voltage switches. It must be considered further that there are four modules. One could connect the corresponding buses directly together and thus use one pair of voltage-current switches to control the four corresponding X wires in parallel. However, it is advisable to use separate sets of switches for each module, but to control them in parallel. This is now done with the predrive system representatively shown in FIG. 8 for the control of the X wire X 14.

As stated, the positive current bus XPC0 is under control of positive current switch numbered 210, having a transistor 211 the collector of which connects to a source of positive potential, while the emitter connects to bus XPC0. A transformer 212 connects the emitter collector path of the transistor to the predrive system. The transformer 212 has a primary winding 151 connected in series with three additional primaries 152, 153 and 154 pertaining to transformers, the respective secondaries thereof control positive current switches, similar to switch 210, and for the three other but corresponding current buses XPC0 in the three other memory modules.

Current will flow through the series-connected primaries 151, 152, 153 and 154 together in case a predrive switching transistor 156 and a second predrive switching transistor 157 are conductive. The series circuit as defined by the four windings 151, . . . , 154, together with a diode 155, can be regarded as a "point" or position of a four by four predecoder matrix 15-1. There are thus 16 such series circuits each energized if one pair of predrive switches is rendered conductive. There are accordingly, eight predrive switches connected to form a four by four matrix. Switch 156 is chosen to be rendered conductive by the two addressing bits $L_1$ and $L_2$ and by the write clock signal WC. A gate 158 responds to coincidence of those signals. There are three current drivers, in addition to driver 156, and three corresponding gates, each responding to the write clock signal WC and to the bit signal combinations ($L_1$–$NL_2$), $NL_1$–$L_2$) and ($NL_1$ –$NL_2$). Voltage switch 157 is controlled by an AND gate 159 responding to addressing bits $L_3$ and $L_4$ and also to the write clock signal WC. Three additional voltage switches complete the matrix, and they are respectively controlled by signal $L_3$–$NL_4$; $NL_3$–$L_4$; $NL_3$–NL and, of course, by the write clock signal WC.

The corresponding sixteen negative current switches are controlled by a similar predrive matrix 15–2 responding to the same subcode bits L whereby, however, the respective gates for the current and voltage drivers are controlled from the read clock signal RC. The positive and negative voltage switches each are controlled respectively through two, two by four predrive matrices 15–4 and 15–3. Each is controlled in response to addressing bits $L_5$, $L_6$ and $L_7$, and the distinction is established again by the read and write clock signals RC and WC.

One can see that the memory size can easily be increased by increasing the predrive system to accomodate more than one 4–K basic memory unit so as to control additional current and voltage switches cooperating then with different memory modules as provided in addition to the four byte modules establishing the basic 4–K memory system as described.

Y WIRE SYSTEM

The Y wires combine addressing function with determination of bit values proper during the record or write cycle. Thus, each of the four (four and a half) bit groups on a card, has its own Y wire system. As can be seen best in FIG. 5, individual Y wire traverses two columns of the core matrix and in opposite directions. A Y wire thus begins and terminates at the same side and along the border of areas 110A and 140A on a card. Each wire extends to the border between areas 110A and 130A and loops back. One needs $2^5$ or 32 Y columns and since each Y wire is used in two columns, only sixteen Y wires are needed for each bit position of 4–K bit locations. A so-called Y—Y decoder matrix is provided for each bit position with four groups per card for the four different bits.

The Y wires on each card begin and terminate in the same card. The Y wire system for each bit position has a four by four decoder matrix and the Y wires $Y_0$ to $Y_{15}$ are organized in accordance with that matrix pattern. Again, this organization scheme has nothing to do with physical location.

Wires $Y_0$, $Y_4$, $Y_8$ and $Y_{12}$ each connect to a voltage bus VY0, some of which were shown on area 142B in FIG. 4*b*. The connection pattern is readily ascertainable from FIG. 7 with wires $Y_3$, $Y_7$, $Y_{11}$, and $Y_{15}$ connecting to voltage bus VY3. After traversing two columns of cores, each Y wire connects to a pair of decoder diodes *d*1 and *d*2. The cathode-anode junction of a pair of such diodes form the connection to the respective Y wires which run through some of the apertures of the row of apertures 145 along the border of areas 110 and 140 in FIGS. 4*a* and 4*b*. The diodes are arranged on area 140B of a card. The diodes *d*1–0, *d*1–1, *d*1–2 and $d1$–3 connect respectively wires $Y_0$, $Y_1$, $Y_2$ and $Y_3$ to positive current bus YPO. The corresponding diodes $d2$–0, $d2$–1, $d2$–2 and $d2$–3 respectively connect the same wires to negative current bus YNO. There are altogether four groups of current bus lines $YP_O$, $YN_O$, $YP_1$, $YN_1$, $YP_2$, $YN_2$, and $YP_3$, $YN_3$, as illustrated and they define two groups of four current bus lines each. These two groups are not (as in the X system) used to differentiate between recording and reading; but their respective usage is of immediate addressing significance. Looking at FIG. 1, one can see that the two cores on each Y wire and on the same X wire have the same orientation. However, the Y wire runs in opposite directions to that for a particular current direction in the Y wire and for the mode dependent current direction in the X wire, but only one of the two cores receives coincidence magnetization signals.

Proceeding now to the description of FIG. 9, there is shown representatively a single Y wire, such as $Y_3$, which can be energized by concurrent operation of either a positive current switch 251 with a negative voltage switch 253 or of a negative current switch 252 with a negative voltage switch 254. Accordingly, the Y drive system for each bit position has four positive current switches, four negative current switches, four positive voltage switches and four negative voltage switches. The positive current switches respectively connect to the four current buses $YP_O$ to $YP_3$, the negative current switches connect to bus $YN_O$ to $YN_3$, and pairs of positive and negative voltage switches connect to the four voltage buses $VY_O$ to $VY_3$.

For addressing all bits of a word location and since the Y system provides bit value distinction during a memory write cycle, there are, for example, altogether 33 positive current switches and thirty-three negative voltage switches, which have to be turned on for addressing a particular location to the word level. Therefore, 33 particular current switches including, for example, switch 251, have to be turned on, in parallel and through the same addressing system. This is done through predrive circuit 16–1. Therefore, the positive current switch 251 has its emitter base circuit controlled through a transformer 10–0. There are altogether 32 additional such transformers respectively denoted with reference to numerals 16–1 through 16–32. The secondary windings of the transformers control respectively 33 current switches in parallel. The primary windings of all these transformers are connected in series, and they are connected to a predriver switch 162 which, in turn, is controlled by an AND gate 163, being part of the predecoder system for the Y system. There are three additional predriver switches which, together with driver 162, respectively, control the four (times 33) current switches connected to the respective positive current buses $YP_O$ to $YP_3$ and for each of the 33 bit positions. The four predriver switches are input controlled by a two bit code, being a portion of the five bit subcode for the Y system. These may be bits $L_8$, $L_9$, $L_{10}$, $L_{11}$ and $L_{12}$. For example, addressing bits $L_8$ and $L_9$ control gate 163. The three corresponding gates for the three other predriver switches respectively respond to $L_8$–$NL_9$; $NL_8$–$L_9$; $NL_8$–$NL_9$. This control, however, does not suffice because, as stated above, the current direction through is of addressing significance and must distinguish between the record and the read (clear phases).

It is apparent that for a current through a Y wire, in cooperation with the current through an X wire, the following cases are to be distinguished. For recording the current through the X wire may have a first direction, and the current through the Y wire may have first direction. The Y wire has two intersections with the X wire but recording of a "one" will take place in but one of the two cores. When the current in the Y wire reverses to flow in the second direction, without current reversal in the X wire, a "one" will be recorded in the second core. If the currents in the X wire and in the Y wire reverse to flow in the second direction (for the clear/read case), then the first core will be placed in state "zero". When the current in the Y wire flows in the second direction, the second core will be placed in "zero" state, when the current in the Y wire flows in the second direction. It follows then that, for example, switch 162 should be rendered conductive by gate 163, so that when positive current flows through the Y wire if one of the respective two Y columns is to be addressed for the read/clear case or if the other one of the respective two Y columns is to be addressed for the record case. Using addressing $L_{10}$ for column distinction, the gate assembly 164 thus provides a true signal at the write clock signal WC when $L_{10}$ is true, and at the read clock signal RC when $NL_{10}$ is true.

The predrive system 16-3 for the corresponding negative voltage switch 253 is controlled through a similar predrive system. The predrive system for the negative voltage switch 253 drives additional other 32 negative voltage switches, and comprises four predriver switches respectively responding to four combinations of addressing bits $L_{11}$ and $L_{12}$. The fifth bit, $L_{10}$, of the Y subcode is used also here together with read and write clock signals to distinguish the current direction in accordance with the logic function $L_{10}$ WC + $NL_{10}$ RC. Negative current switches including switch 252 and positive voltage switches including switch 254 are controlled in an analogous manner. Predrive system 16–2 is similar to system 16–1 and it predecodes likewise address bits $L_8$ and $L_9$. Address bit $L_{10}$, however, is combined with read and write clock signals in the complementary fashion, providing a true signal for $L_{10}$ RC + $NL_{10}$ WC. Predrive system 16–4 responds also to the same latter combination signal and to the four combinations made possible with bits $L_{11}$ and $L_{12}$.

As was mentioned above, the Y system includes, in addition, the record control proper, i.e., it combines the output of the M register with the addressing function as described. This is done by inhibition control. For example, switches 251 will control current in a particular direction and in one particular Y wire, such as $VY_3$. By cooperation with a particular X wire current, a "one" will be recorded in one particular core unless current flow in switch 251 is inhibited. The inhibition of switch 251 is under control of an inhibitor switch 351 having its emitter-base circuit coupled to an AND gate 352 which responds to the write clock signal WC and connects to one particular state of the M register. Inasmuch as it is assumed that we consider bit position "zero" (see transformer 16–0) AND gate 352 provides a true signal when a "zero" is held in the stage MO, as represented by a true signal NMO. Switch 351, when rendered conductive by RC-NMO, grounds the collector of switch 251, and current flow is inhibited in the particular Y wire. As was stated above, recording (writing) is always preceded by clearing or reading of all thirty-three wires pertaining to a particular word location. During clearing and reading these thirty-three cores of a particular word location are all reset to "-zero". During recording a "zero" is recorded by not recording a "one", which is the inhibition control by a signal NMY with Y=0, 1, 2, . . . , 32.

THE SENSE WIRE SYSTEM

For each bit on the card there are two sense wires, each having two ends leading to printed circuit contacts such as 145A or B or 146A or B as was explained above with reference to FIGS. 4*a* and 4*b*. The two wires are denoted 30–0 and 31–0 in FIG. 10 for bit position zero. The sense wire 30–0 runs along the lower half of the first Y column, then crosses over to run through the upper half of the second Y column loops around to run back along the upper half of the sixth Y column and then through the lower half of the fifth Y column, up again through the first half of the ninth Y column, etc. The terms "upper" and "lower" are here used merely for orientation in FIG. 10. Moreover, this portion of sense wire 30–0 is provided with small crosslines to facilitate tracing.

The core matrix for each bit position has 32 Y columns. Toward the right-hand end of the matrix area wire 30–0 runs into the upper half of the 30th Y column, crosses over to run through the lower half of the 29th column. The lowest point then is the return point for sense wire 30–0 marked by placement of reference numeral with an (*). From the return point, the sense wire runs through the lower half of the 30th Y column, upper half of the 29th Y column, etc. The sense wire 30–0 then comes from the upper half of the ninth Y column, crosses over to the lower half of the tenth Y column, loops back up through the lower half of the sixth Y column, and crosses over to run through the upper half of the fifth Y column, loops around to run through the upper half of the first Y column, switches over to run through the lower half of the second Y column and from there to a connector contact. This sense wire traverses half of the total number of Y columns. Moreover, one can see that this one sense wire traverses any of the Y column completely, but in different parts of its route, so that stray flux components induced into the sense wire by a Y wire and by all cores of one complete Y column, cancel. Whenever one of the cores along that column is addressed because current runs through that Y wire, a voltage is induced in both portions of the sense wire traversing through that entire column, but since portions of the sense wire along the upper half of the column and the portion of the sense wire along the lower half of the column are connected opposite to each other, the induced voltages cancel. Thus, any voltage which appears across the two terminals of the sense wire is, in fact, due to a flux change in an addressed core having bit value "one" at the time of the addressing for reading.

As one can see from FIG. 5, all of the cores which (1) are traversed by any X wire connected to a decoder on one card and (2) being traversed by a single, looped Y wire, have the same, diagonal orientation. It follows, therefore, that by comparing the cores along the two columns, "ones" are being recorded as magnetization which is spatially oriented similarly in these cores. The other branch of the same Y wire traverses cores having the opposite orientation. It is this reason why the current must be reversed in the Y wire if one or the other of the cores on the same X wire are to be addressed. On the other hand, the incomplete addressing of all cores along the column of the other half of the particular Y wire may result in disturbances, which, on a statistical basis, will cancel but not necessarily completely cancel. This is the reason that two sense wires per bit position are needed. The two sense wires are threaded through the cores so that no two columns traversed by the same Y wire are associated with the same sense wire.

The two sense wires of each bit position are connected to two differential amplifiers, the respective outputs of which connect parallelly to one stage of the M register. The read clock pulse RC or a pulse essentially synchronous therewith is used to check the voltage of the sense line into the M register. The output of the respective differential amplifier connected to the sense wire coupled to columns not holding the core of the addressed location is suppressed.

The invention is not limited to the embodiments described above but all changes and modifications thereof not constituting departures from the spirit and scope of the invention are intended to be covered by the following claims.

What is claimed is:

1. A memory unit comprising:

a first and second printed circuit type module card;

a first plurality of addressing lines, each affixed with opposite ends respectively to the first and second cards and extending across first and second areas respectively of the first and second cards and including lines crossing directly from one card to the respective other one;

a second plurality of addressing lines arranged on the first card only to form an array of insulated intersections with the lines of the first plurality;

a third plurality of addressing lines arranged on the second card only to form an array of insulated intersections with the lines of the first plurality;

a plurality of bistable storage cells respectively coupled to the pairs of lines forming an intersection of the arrays; and circuit means on each of the cards including printed circuit lines for providing individual circuit paths to the lines of the pluralities;

and including first circuit means on the first card connected to the lines of the second plurality to provide bit position distinguishing signals concurrently to several of the lines of the second plurality, each signal being dependent additionally on a bit value for the respective bit position;

and including second circuit means on the second card connected to the lines of the third plurality to provide bit position distinguishing signals concurrently to several of the lines of the third plurality, each signal dependent additionally on a bit value for the respective bit position, all of the bit positions on the first card being different from all of the bit positions on the second card.

2. A memory unit as set forth in claim 1, the circuit means on each card including a first plurality of printed circuit bus lines, each connecting to a different plurality of one-half of the first plurality of addressing lines; and a second plurality of printed circuit bus lines, each connecting to a different plurality of the other half of the first plurality of addressing lines, so that each line of the first plurality is connected to a unique combination of bus lines of the first plurality on the first or the second car and of a bus line of the second plurality on the respective other card.

3. A memory unit as set forth in claim 1, the second and third pluralities being equal in number, each of the second and third pluralities of lines being organized in several groups, the number of lines per group being half the number of the first plurality.

4. A memory unit as set forth in claim 1, the lines of the second and third pluralities being organized in pairs, lines of each pair being serially interconnected, a pair of serial interconnected lines intersecting each line of the first plurality twice.

5. A memory unit as set forth in claim 1, second circuit contact means along an edge on each card for providing input connections to the first circuit means.

6. A memory unit as set forth in claim 1, the circuit means comprising:

a bus system on each of the cards connected to the lines of the first plurality and including means for receiving control signals in pairs, one on each card so that one card of each module receives one control signal of the pair and the other card receives the respective other one of the pair, the bus system on each card including decoding means so that each pair of control signals energizes but one line of the first plurality.

7. A memory unit as in claim 1, wherein the bistable store cells are memory cores, and addressing lines include wires, the wires as part of the lines of the first plurality each being continuous as passing from one card to the other one and having the cores strung thereon, one core per intersection.

8. The unit as set forth in claim 1, comprising means interconnecting the cards for folding to obtain selectively different mutual orientation including a parallel, side by side position and in a substantially coplanar position, the lines of the first plurality being flexible at least where crossing over the interconnecting means.

9. A memory unit as set forth in claim 8, the means for interconnecting including a flexible hinge.

10. A memory unit as set forth in claim 8, comprising a pair of extraction levers linked to the cards for facilitating positioning and removal of the unit.

11. A memory unit as in claim 1, wherein the cells are individual magnetic cores, the addressing lines being wires traversing the cores, the wires of the first plurality continuously traversing cores of the plurality on card, crossing over to the other card and traversing cores of the plurality on the other card, the two cards interconnected by a flexible hinge, the memory unit further including decoder means distributed among the two cards and including a printed circuit bus system on each card establishing a first and a second decoder matrix, the rows of the first matrix and the columns of the second matrix being on one card, the columns of the first matrix and the rows of the second matrix being on the other card.

12. A memory unit as set forth in claim 11 the wires of the second and third pluralities being organized in groups, the wires of each group intersecting two cores on each wire of the first plurality, and being all on one of the cards;

a first and a second plurality of bus lines for each group and on the respective one of the cards, the product of the first and second pluralities of bus lines being equal to the number of addressing lines of the group, each addressing line of the group connected to a unique combination of one of the first plurality of bus lines and one of the second plurality of bus lines.

13. A memory unit as set forth in claim 11, comprising printed circuit contacts on each card along the edge opposite to the edge of the interconnecting means.

14. A memory unit for digital data, the digital data being organized in words, each word comprising plurality bit groups, the memory unit being capable of storing N data words, each bit being stored in a bistable storage cell, comprising:

a plurality memory modules, each for storing groups of N bits each, one group per word, each module being comprised of a printed circuit, two-card module, a card of a module of the plurality respectively having storage cells for storing one-half of the number bits of each bit group stored in the module to which the card pertains;

an array of X, Y addressing lines in each module for providing coincidence signals to the storage cells of the respective module, the Y lines organized in systems, there being as many Y line systems in each module as the bit groups stored in the module have bits, the X lines completing the input for the N storage cells for each bit to be stored in the module, the X lines extending from one card of a module of the plurality to the respective other card of the module;

means for receiving addressing signals including connecting terminals on the cards and distinguishing among the N word locations of the unit and including decoder means on the cards for providing first addressing control signals in response to each addressing signal received;

printed circuit lines on the cards connected to the decoder means for receiving the control signals and further connected for energizing a particular X line in each module; and means including printed circuit lines on the cards providing addressing control signals for each of said Y line systems.

15. A memory unit as in claim 14, each storage cell being a magnetizable core, the addressing lines including flexible wires, the X-line wires each extending from one card of a module to the respective other card thereof and having cores strung thereon, one core per intersection.

16. A memory unit as set forth in claim 14, the X line system on each module having two square matrix decoders, each distributed over the two cards for respectively addressing half of the X lines of the system.

17. A memory unit as set forth in claim 14, wherein the number of Y lines per module equals the number of X lines.

18. A memory unit as set forth in claim 14, wherein the Y line systems of a module each are connected to square-matrix decoder bus lines constituting the receiving means.

19. A memory unit as set forth in claim 14, the means for receiving addressing signals comprising:

first circuit means external to the modules and responsive to a first portion of each of one addressing signal, and providing a pair of addressing control signals;

a bus system on each of the cards connected to the X lines and to the first circuit means, so that one card of each module receives one control signal of the pair and the other card receives the respective other one of the pair, the bus system on each card including decoding means so that each pair of control signals energizes but one X addressing line of each module.

20. A memory unit as set forth in claim 19, including second circuit means external to the modules, and responsive to the first portion of each of the addressing signals and providing a second pair of control signals;

a second bus system on each of the cards connected to the X lines, and to the second circuit means analogous to connection of the first circuit means to the first bus system for energizing the respective X lines in the opposite sense; and circuit means for selectively operating the first and second circuit means.

21. A memory unit as set forth in claim 14, wherein the means for receiving include first circuit means external to the modules and being responsive to a particular portion of each of the addressing signals and producing as many pairs of control signals as a word has bits;

a plurality of bus systems, one per Y line system so that each bus system of the plurality is respectively associated with a Y line system and on the same card as the respectively associated line system;

each bus system respectively responsive to the pairs of control signals for energizing one Y line of each Y system.

22. A unit as set forth in claim 21, including means connected for controlling at least one control signal of each pair in accordance with a data word to be stored.

23. A unit as set forth in claim 22, each Y line being disposed for providing inputs for two storage cells together with each X line, the first circuit means and the bus system for each Y line system being connected so that by operation of the polarity of the energizing signal one or the other of the two storage cells is energized, both being connected to the same X line being concurrently energized.

24. A memory unit comprising:

a first and a second printed circuit card interconnected to permit selective folding to obtain a side by side position of the cards and an essentially coplanar position thereof;

a first plurality of addressing lines, each strung for extending directly from the first card to the second card and continuing respectively over particular areas thereof, the lines being flexible at least where crossing over from the first card to the second card;

a plurality of decoders, half of the plurality being disposed on the first card and respectively connected to half of the first plurality of lines, the remaining half of the plurality of decoders being disposed on the second card and being respectively connected to the remaining half of the lines;

a second and a third plurality of addressing lines respectively disposed on the first and second cards for intersecting the line of the first plurality to form an array of storage places respectively defined by an insulated intersection of a line of the first plurality and a line of the second and third pluralities;

a second and a third plurality of decoders respectively on the first and second cards and respectively connected to the lines of the second and third pluralities;

a plurality of bistable storage cells disposed respectively at the intersections, each cell of the plurality being coupled to the lines respectively forming the intersection; and printed circuit means on the cards for connecting the decoders to printed circuit contacts along at least one particular edge of each of the first and second cards.

25. A memory unit as in claim 34, each storage cell being a magnetizable core, each addressing line including a wire on which the cores are strung, one core per intersection, the wires of the first plurality of addressing lines crossing from the first card to the second card.

26. A memory module comprising:

a first and a second printed circuit card;

an X–Y array addressing line system on each of said cards, defining a matrix of separated intersections of each Y-line of the system with each X-line of the system each line including a flexible wire;

a plurality of magnetizable cores respectively connected to the X wire and the Y wire of the intersection;

hinge means for connecting the first card to the second card;

each of flexible wires of the X-lines respectively strung across the first card traversing plural cores of the plurality, continuing across the hinge means and traversing additional cores of the plurality on the second card, to form continuous X wire on both of the cards and as crossing the hinge means;

first circuit means on the first and second cards respectively for completing an X-line addressing circuit for each X-line as it extends on both cards; and second circuit means on each card for completing a Y-line addressing circuit for the Y-lines on the respective card.

27. A memory module as in claim 26, each storage cell being a magnetizable core traversed by the wires as pertaining to the lines.

28. A module as set forth in claim 26, the first circuit means includes:

a first plurality of printed circuit bus lines on the first card;

a second plurality of printed circuit bus lines on the second card;

the printed circuit bus lines of the pluralities being connected to one-half of the plurality of said continuous X lines, in that like pluralities of the one-half of the plurality of X lines on the first card connect to each bus line of the first plurality and like pluralities of the one-half of the plurality of X lines on the second card connect to each bus line on the second plurality so that each of the one-half of the plurality contiguous X lines connects to a unique combination of one bus line of the first plurality and one bus line of the second plurality.

29. A module as set forth in claim 26, the first circuit means includes a second plurality of printed circuit bus lines on the first card respectively connected to the same X lines to which the bus lines of the first plurality connect, there being a pair of diodes connected in the respective connection between a bus line of the first plurality and a bus line of the second plurality on one hand, and the respective X lines on the other hand.

30. In a memory module a first printed circuit card having a first area for mounting magnetic cores;

a first and a second plurality of respectively interspaced parallel wires extending across the first area;

means for fastening one end only of each of the wires of the first and second pluralities of wires on the card;

a first plurality of decoding means on a second area of the card;

printed circuit etchings on the card for connecting the decoders of the first plurality respectively to ends of the wires of the first plurality;

a plurality of printed circuit bus lines on a third area of the card;

circuit means for connecting the ends to the second plurality to the bus lines;

a third plurality of wires arranged on said first area, each wire of the third plurality being transverse to the wires of the first and second plurality, to form an array of intersections on the first area, each wire of the third plurality intersecting each wire of the first and second pluralities twice;

a plurality of magnetizable cores respectively disposed at the intersections and being coupled to the wires forming the intersection;

a second plurality of decoding means respectively connected to the wires of the third plurality;

means on the card providing printed circuit signal paths from an edge of the card to the decoders of the pluralities and to the bus lines; and a second card similar constructed as the first card, the respective other ends of the wires of the first and second pluralities affixed to the second card, and connected to additional decoding means, completing the decoding means of the first and second pluralities.

31. A memory module card as set forth in claim 30, each wire of the third plurality having a first and second portion, each intersecting all wires of the first and second pluralities.

a first sense wire, coupled to the cores along the first portion only of each of the wires of third plurality in a manner that a portion of the sense wire runs along the two halves of a first portion of each of the wires of the third plurality in opposite direction as to any current flowing the respective wire of third plurality and the first sense wire; and a second sense wire coupled to the cores along the second portion only of each of the wires of the third plurality in an analogous manner.

32. A memory matrix having an X wire system, a Y wire system, and a plurality of cores, each one being in a matrix point and threaded through by an X wire of the system and by a Y wire of the system, comprising in combination:

each Y wire of the system defining two matrix points with each X wire of the system, each Y wire being representative of two matrix columns;

a pair of sense wires, a first sense wire of the pair traversing one-half of the cores along one Y matrix column each of every Y wire and in one direction and the respective other half of the cores along the respective Y column in the opposite direction in relation to any current flowing through the sense wire of the pair, the respective other sense wire traversing the cores along the respective other Y column of every Y wire.

33. A memory unit comprising:

a first and a second printed circuit card interconnected to permit selective folding to obtain a side by side position of the cards and angular position thereof;

a first plurality of addressing lines, each strung for extending directly and continuously from the first card to the second card and respectively over particular areas thereof, the lines being flexible at least where crossing over from the first card to the second card;

a second plurality of pluralities of addressing lines, distributed over the cards for intersecting the lines of the first plurality to form an array of storage places respectively defined by an insulated intersection of a line of the first plurality and a line of the second plurality;

a pair of square matrix decoder systems, each of the two square matrix decoder systems having rows and columns, the rows and columns of each decoder system being distributed over the two cards, that the rows are on one card, the columns on the other;

printed circuit lines on the cards for connecting the decoder systems to the lines of the first plurality;

a decoder system for each of the second plurality of pluralities of addressing lines;

printed circuit lines on the cards for connecting the decoder system to the addressing lines of the second plurality; and printed circuit lines including terminal connections along the edges of the cards, connected to the respective decoder systems for passing thereto addressing signals externally applied on the cards.

34. A memory unit as in claim 33, each intersection having a magnetic core, the addressing lines each including a wire strung from the first card to the second card and having the cores mounted thereon for placement at the intersections.

35. A unit as set forth in claim 33, wherein each of the decoder systems for the second plurality is a square matrix decoder.

36. A unit as set forth in claim 33, wherein the number of addressing lines in each plurality of the second plurality are similar, and that number times the number constituting the second plurality equals the number of the first plurality.

37. A memory unit for digital data, the digital data being organized in words, each word comprising a plurality of bit groups, each group having a plurality of bits, the memory unit being provided for storing N data words, each bit being stored in a storage cell, comprising:

a plurality of memory modules, each module being a unit for holding all of the storage cells for all bits of one bit group of all N words;

an array of X and Y addressing lines in each module for providing addressing signals to the bit storage cells of the respective module, all of the Y lines of a module establishing a Y line system the Y line system organized in Y line subsystems, there being as many Y line subsystems in each module as the bit group stored in the module has bits;

means in each module for receiving addressing signals, for selectively addressing one of the X lines of the array, the address signal being applied in parallel to all modules, each module separately decoding each of the addressing signal as received; and means for receiving a group of addressing signals, one pair per Y subsystem, for addressing one Y line per subsystem of the array on each module and including word address decoding means on each of the modules for operation in parallel on all modules, further including bit value distinguishing means for selectively operating the addressed Y line in each subsystem.

38. A memory unit as set forth in claim 37, the modules each having matrix decoder means for receiving pairs of addressing signals, each pair uniquely addressing one of the X or Y lines.

39. A memory unit as set forth in claim 38, the matrix decoder means being square type matrices.

40. A memory unit as in claim 39, wherein each storage cell is a memory core, each module having two hinged cards, the X-lines of each module being wires, each wire extending across the two cards, the cores strung on these wires.

* * * * *